(12) United States Patent
Tu et al.

(10) Patent No.: US 12,111,673 B2
(45) Date of Patent: *Oct. 8, 2024

(54) MULTI-PHASE VOLTAGE REGULATOR CONTROL

(71) Applicant: Hubbell Incorporated, Shelton, CT (US)

(72) Inventors: Hung Van Tu, Largo, FL (US); Thaichong Li, Oldsmar, FL (US); James Robert Wulff, Clearwater, FL (US); Lawrence Deward Bach, St. Petersburg, FL (US); Ravi Manda, Palm Harbor, FL (US); Murty Yalla, Largo, FL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,138

(22) Filed: Aug. 24, 2023

(65) Prior Publication Data

US 2023/0393597 A1 Dec. 7, 2023

Related U.S. Application Data

(63) Continuation of application No. 17/893,717, filed on Aug. 23, 2022, now Pat. No. 11,747,840.

(60) Provisional application No. 63/251,342, filed on Oct. 1, 2021, provisional application No. 63/241,294, filed on Sep. 7, 2021, provisional application No. 63/236,080, filed on Aug. 23, 2021.

(51) Int. Cl.
*G05F 1/14* (2006.01)
*G05F 1/147* (2006.01)

(52) U.S. Cl.
CPC .................................. *G05F 1/147* (2013.01)

(58) Field of Classification Search
CPC ................................. G05F 1/147; Y02E 40/50
See application file for complete search history.

(56) References Cited

U.S. PATENT DOCUMENTS

| 4,323,838 A | 4/1982 | Pettigrew |
| 5,117,175 A | 5/1992 | Pettigrew et al. |

(Continued)

OTHER PUBLICATIONS

PCT/US2022/041202 International Search Report and Written Opinion dated Nov. 17, 2022 (7 pages).

*Primary Examiner* — Jue Zhang
*Assistant Examiner* — Afework S Demisse
(74) *Attorney, Agent, or Firm* — Michael Best & Friedrich LLP

(57) ABSTRACT

A control system for a multi-phase power system includes a first phase line, a second phase line, and a third phase line. The control system includes a plurality of regulator controls including a first regulator control configured to control a first tap changer associated with the first phase line, a second regulator control configured to control a second tap changer associated with the second phase line, a third regulator control configured to control a third tap changer associated with the third phase line, and an electronic processor coupled to the first regulator control, the second regulator control, and the third regulator control. The electronic processor is configured to regulate the voltage of the multi-phase system using the first, second, and third regulator controls.

20 Claims, 17 Drawing Sheets

(56) References Cited

U.S. PATENT DOCUMENTS

| | | | |
|---|---|---|---|
| 5,428,551 A * | 6/1995 | Trainor | G05F 1/14 |
| | | | 700/298 |
| 5,581,173 A | 12/1996 | Yalla et al. | |
| 2013/0229159 A1* | 9/2013 | Daley | G05F 1/12 |
| | | | 323/255 |
| 2013/0229162 A1 | 9/2013 | Kromrey et al. | |
| 2019/0229553 A1* | 7/2019 | De Vries | H02J 13/00006 |

* cited by examiner

Ganged Average

Ganged Controlling Phase Mode

Multi-Phase Average

MULTI-PHASE VOLTAGE REGULATOR CONTROL

RELATED APPLICATIONS

This application is a continuation of U.S. patent application Ser. No. 17/893,717, filed on Aug. 23, 2022, which claims the benefit of U.S. Provisional Patent Application No. 63/236,080, filed Aug. 23, 2021, U.S. Provisional Patent Application No. 63/241,294, filed Sep. 7, 2021, and U.S. Provisional Patent Application No. 63/251,342 filed Oct. 1, 2021, the entire contents of which are hereby incorporated by reference.

FIELD

Embodiments relate to multi-phase voltage regulators and control thereof.

SUMMARY

One aspect of the present disclosure is directed to a multi-phase voltage regulator controller implemented using voltage regulator controls that are electrically connected to a single printed circuit board for controlling various aspects of each phase of a multi-phase voltage regulator.

In one aspect, a control system for a multi-phase power system includes a first phase line, a second phase line, and a third phase line. The control system includes a plurality of regulator controls including a first regulator control configured to control a first tap changer associated with the first phase line, a second regulator control configured to control a second tap changer associated with the second phase line, a third regulator control configured to control a third tap changer associated with the third phase line, a converter circuit configured to convert power flowing through the first, second, and third phase lines to levels used for powering the first, second, and third tap changers and an electronic processor coupled to the first regulator control, the second regulator control, and the third regulator control. The electronic processor is configured to determine whether a voltage level of the first phase line exceeds a threshold, control a first relay to power the first tap changer with power converted from the first phase line to effect a tap change on the first phase line when the voltage level of the first phase exceeds the threshold, determine whether a voltage level of the second phase line exceeds the threshold when the voltage level of the first phase line is less than the threshold, and control a second relay to power the first tap changer with power converted from the second phase line to effect a tap change on the first phase line when the voltage of the first phase line is less than the threshold.

In another aspect, a control system for a multi-phase power system includes a first phase line, a second phase line, and a third phase line. The control system includes a plurality of regulator controls including a first regulator control configured to control a first tap changer associated with the first phase line, a second regulator control configured to control a second tap changer associated with the second phase line, a third regulator control configured to control a third tap changer associated with the third phase line, and an electronic processor coupled to the first regulator control, the second regulator control, and the third regulator control. The electronic processor is configured to determine an average voltage of the multi-phase power system based on a voltage of the first phase line, a voltage of the second phase line and voltage of the first phase line, determine a voltage regulation command based on the average voltage and a multi-phase setpoint, determine whether the first tap changer, the second tap changer, and the third tap changer are set to a same tap position, issue the voltage regulation command to each of the first, second, and third regulator controls when the first tap changer, the second tap changer, and the third tap changer are at the same tap position.

In another aspect, a control system for a multi-phase power system includes a first phase line, a second phase line, and a third phase line. The control system includes a plurality of regulator controls including a first regulator control configured to control a first tap changer associated with the first phase line, a second regulator control configured to control a second tap changer associated with the second phase line, a third regulator control configured to control a third tap changer associated with the third phase line, and an electronic processor coupled to the first regulator control, the second regulator control, and the third regulator control. The electronic processor is configured to determine whether each of a voltage of the first phase line, a voltage of the second phase line, and a voltage of the third phase line are within band of a target bandcenter, perform a voltage regulation operation when one or more of the voltages of the first phase line, the second phase line, and the third phase line are out of band of the target bandcenter, determine whether any of the voltages of the first phase line, the second phase line, and the third phase line differ from the target bandcenter by more than a threshold, and adjust a tap position of the tap changer associated with the phase line having a voltage furthest from the bandcenter when any of the voltages of the first phase line, the second phase line, and the third phase line differ from the target bandcenter by more than the threshold.

Other aspects of the disclosure will become apparent by consideration of the detailed description and accompanying drawings.

DETAILED DESCRIPTION

FIGS. 1A-1D illustrate various perspective and frontal views of a multi-phase voltage regulator controller 100 according to one or more embodiments of the disclosure. Controller 100, for example, may be used to control the changing of voltage tap positions in a three-phase power system. Voltage tap positions may hereinafter be referred to simply as "tap positions."

As shown, controller 100 includes a front panel 105 that supports various respective control mechanisms, e.g., switches, indicators, etc., that correspond to three respective phase lines, e.g., phase-A, phase-B, phase-C, of a three-phase power system. In particular, the front panel 105 includes a first set of control mechanisms 110A that correspond to a first regulator used for controlling the regulator tap changer(s) associated with a first phase voltage regulator, e.g., phase-A, of a three-phase power system. The first set of control mechanisms 110A that correspond to a first regulator may hereinafter be referred to as the first regulator control 110A. The front panel 105 further includes a second set of control mechanisms 110B that correspond to a second regulator used for controlling the regulator tap changer(s) associated with a second phase voltage regulator, e.g., phase-B, of a three-phase power system. Furthermore, the front panel 105 includes a third set of control mechanisms 110C that correspond to a third regulator used for controlling the regulator tap changer(s) associated with third phase voltage regulator, e.g., phase-C, of a three-phase system. The second set of control mechanisms 110B that correspond to a second regulator may hereinafter be referred to as the "second regulator control 110B" and the third set of control mechanisms 110C that correspond to a third regulator may hereinafter be referred to as the "third regulator control 110C." Accordingly, the controller 100 includes regulator controls 110A-110C that are used to regulate line voltages of each respective phase in a three-phase power system by adjusting voltage tap positions.

In accordance with exemplary embodiments, each regulator control 110A-110C respectively includes, among other things, several switches and/or buttons for controlling operation of a respective phase tap changer for phases A through C of the three-phase power system. For example, each regulator control 110A-110C respectively includes a mode switch 115A-115C used to control whether a respective tap change is manually controlled or automatically controlled by the controller 100. In addition, each regulator control 110A-110C respectively includes power switches 120A-120C, which are used to control whether a tap changer, or tap change motor, is powered by an internal or external power source. In addition, each regulator control 110A-110C respectively includes a tap change switch 125A-125C used for raising and/or lowering the positions of a respective voltage tap.

Figure 1A:
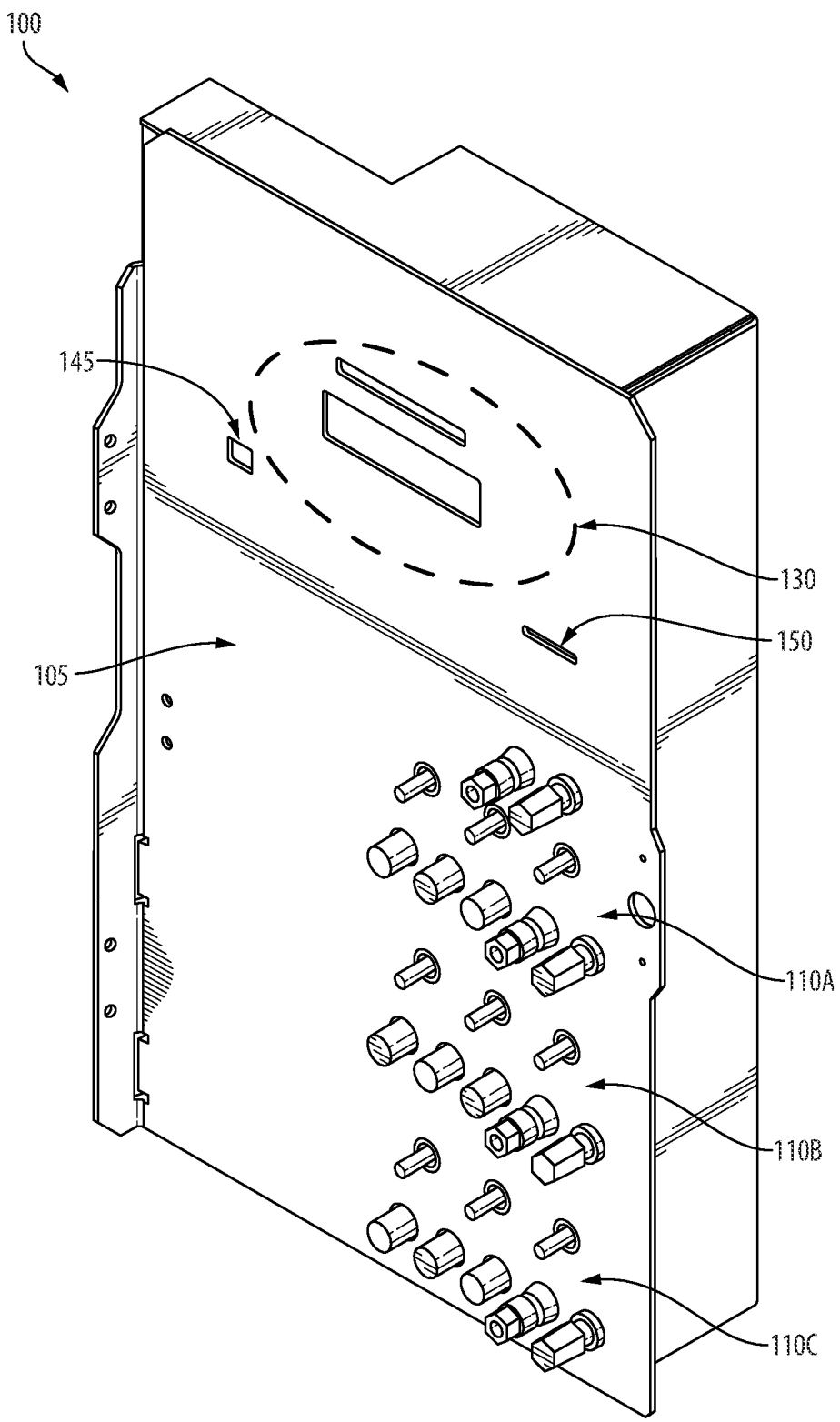
FIGS. 1A-1D illustrate a controller for a voltage regulator tap changing system according to various embodiments.
Figure 1B:
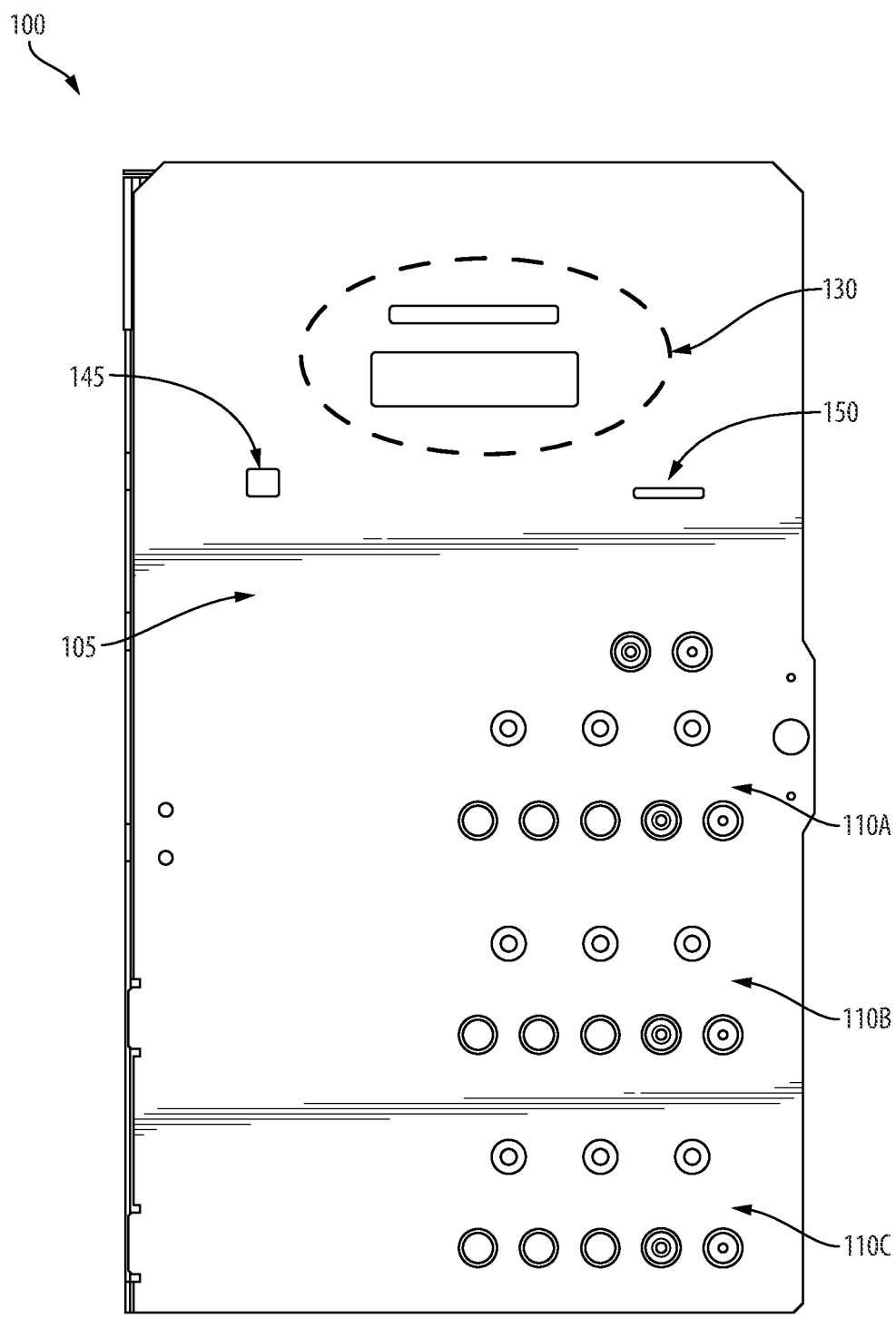
Figure 1C:
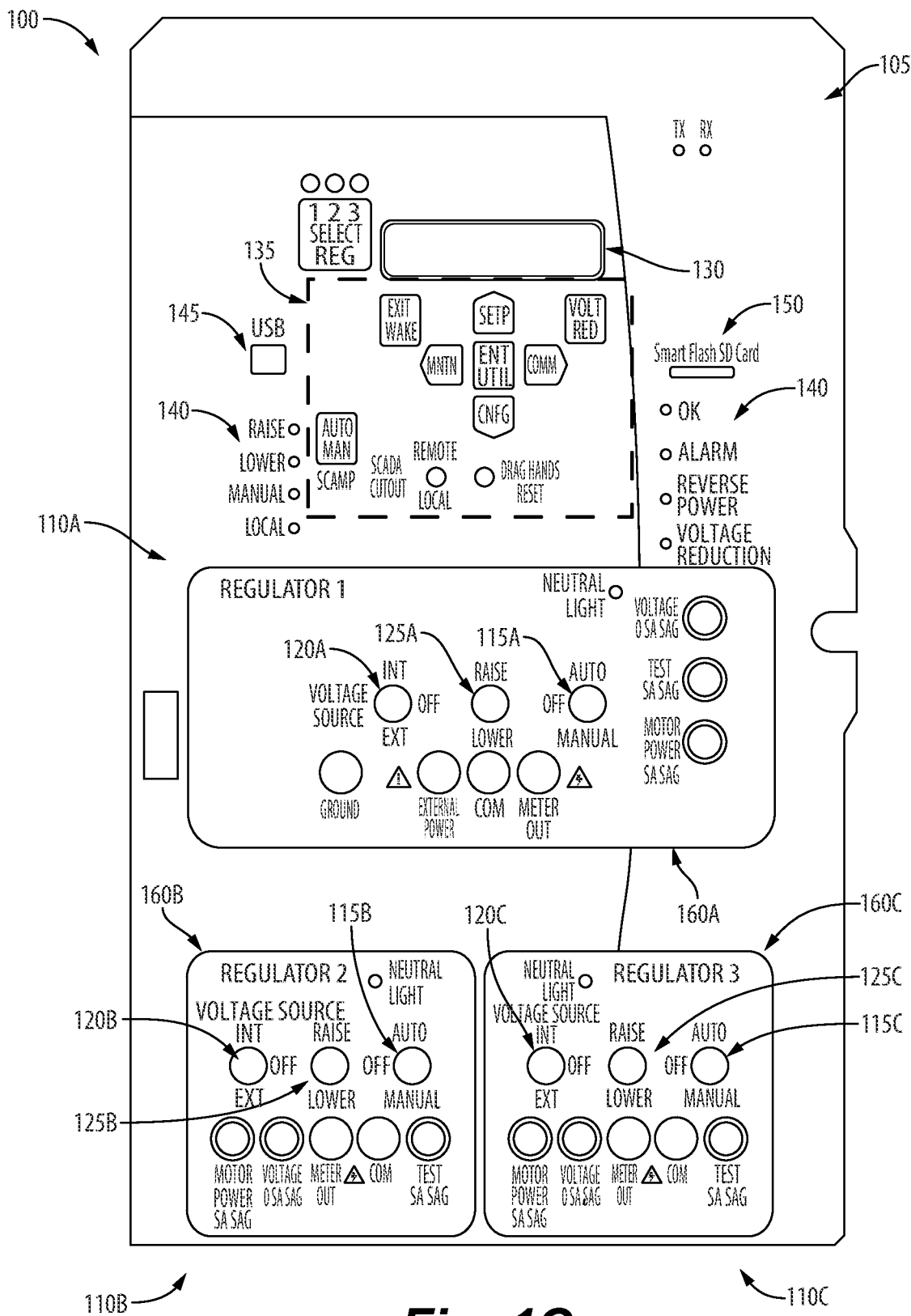
Figure 1D:
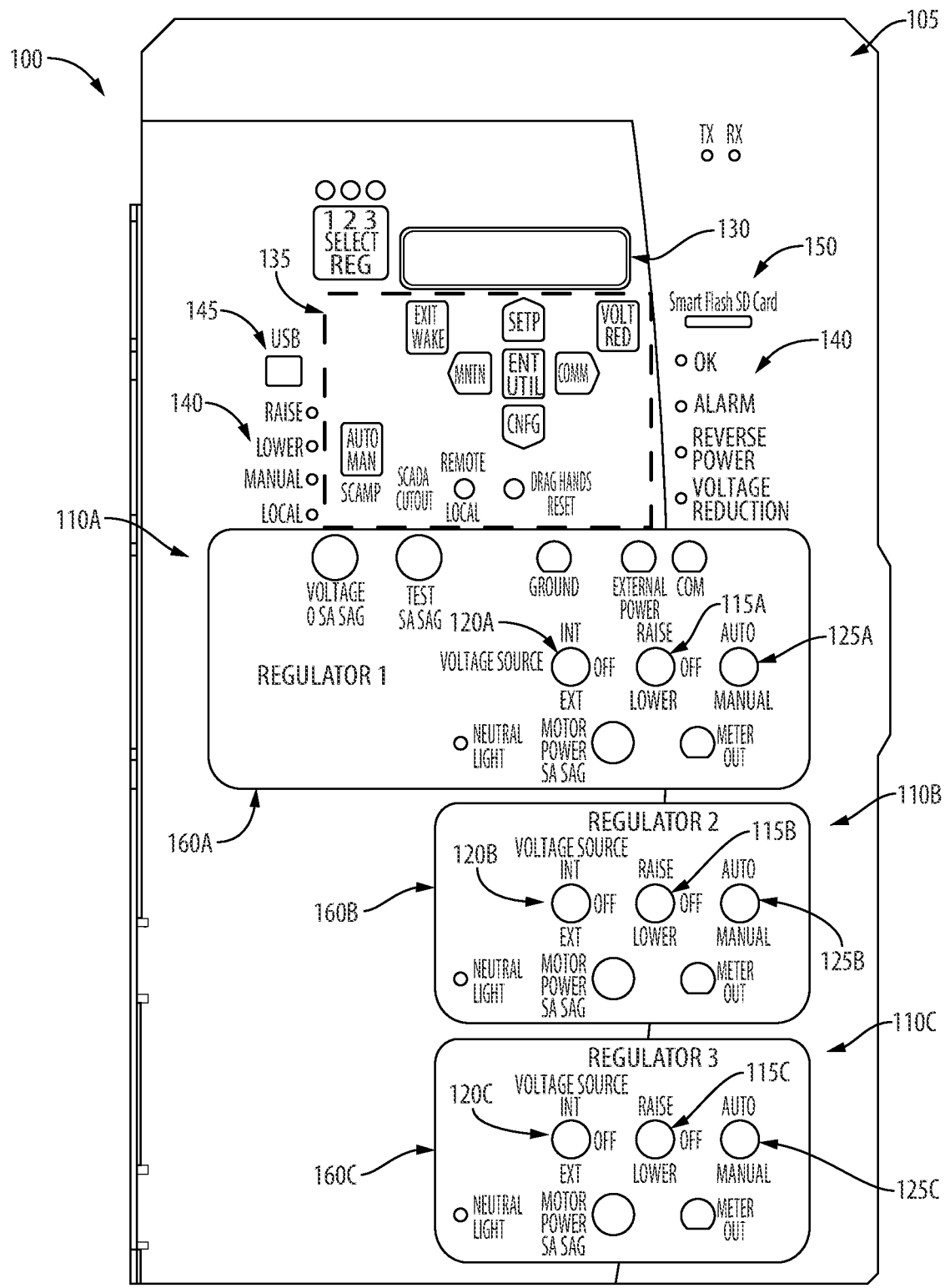

As shown in FIGS. 1C and 1D, the front panel 105 of controller 100 further supports one or more additional user-interface components for controlling and/or monitoring operation of the regulator tap changer for phases A through C. For example, in some embodiments, the controller 100 further includes a display 130 for monitoring various system conditions and several control buttons 135 for providing various inputs to the controller 100. Various indicator lights 140 are also provided for visually indicating certain conditions, such as forward or reverse power, voltage raise or lower operation, and others. In some embodiments, the front panel 105 includes one or more openings that provide access to connection interfaces that provide various modes of communication with controller 100. For example, the controller 100 may include a USB interface 145 and/or smart flash SD card interface 150. Furthermore, in accordance with the exemplary embodiment of FIGS. 1A-1C, the controller 100 may include one or more additional terminal ports that provide power to the three tap changers, or more specifically the motors for the three tap changers to enable mechanical switching to the necessary tap(s).

In some embodiments, such as the ones illustrated in FIGS. 1A, 1B, and 1D, the regulator controls 110A-110C are arranged vertically along the front panel 105. That is, with respect to the front panel 105, the first regulator control 110A is positioned above the second regulator control 110B, which is positioned above the third regulator control 110C. In some embodiments, such as the ones illustrated in FIGS. 1C and 1D, the front panel 105 is segmented into three sub-panels 160A-160C. Each of the three sub-panels 160A-160C corresponds to a respective regulator control 110A-110C. For example, the first sub-panel 160A, labeled "REGULATOR 1," includes the first set of control mechanisms 110A associated with controlling the voltage regulator of the first phase line. Similarly, the second sub-panel 160B, labeled "REGULATOR 2," includes the first set of control mechanisms 110B associated with controlling the voltage regulator of the second phase line and the third sub-panel 160C, labeled "REGULATOR 3," includes the third set of control mechanisms 110C associated with controlling the voltage regulator of the third phase line. It should be understood that arrangement of the regulators 110A-110C on front panel 105 is not limited to the illustrated embodiments of FIGS. 1A-1D, as the regulator controls 110A-110C may be rearranged and/or positioned at various other locations along the front panel 105.

Figure 2:
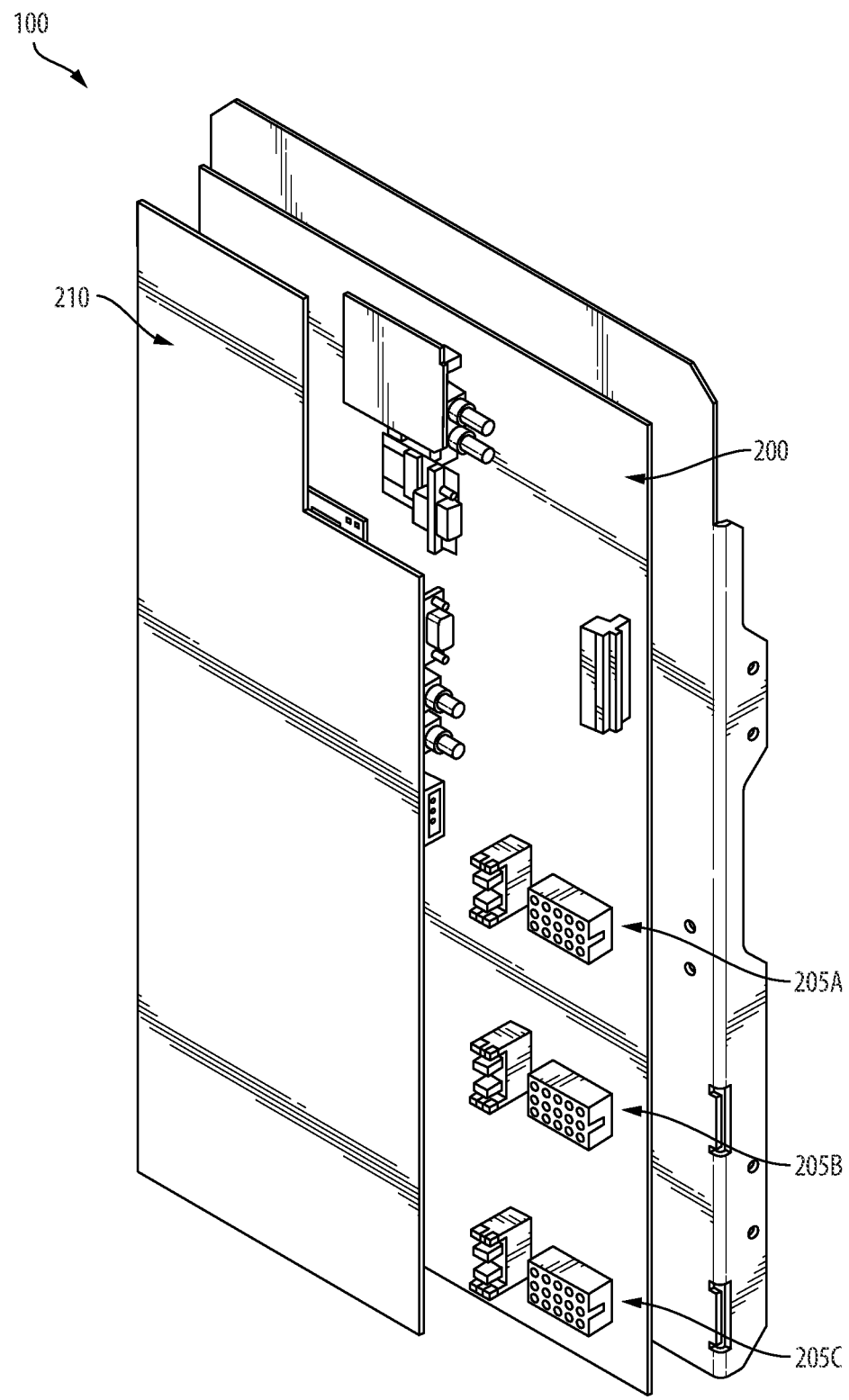
FIG. 2 illustrates a printed circuit board included in the controller of FIGS. 1A-1C

Regardless of whether the front panel 105 is segmented into three separate sub-panels, each one of the regulator controls 110A-110C is electrically connected to a single printed circuit board (PCB) within the controller 100. That is, all the electrical connections for the control mechanisms included in the regulator controls 110A-110C are supported by a single PCB. As shown in FIG. 2, the controller 100 includes a first PCB 200 that provides control and/or power to various components of the controller 100. In particular, the first PCB 200 includes respective interfaces, or connections, 205A-205C that correspond to the control mechanisms and/or power connections included in the regulator controls 110A-110C. Accordingly, the first PCB 200 provides all the necessary processing, control signal generation, and power, for example, to be provided by the regulator controls 110A-110C to the tap changers, for all three phases of the three-phase power system.

The power and control elements of the regulator controls 110A-110C are relatively high-power analog components. In some embodiments, it is preferable to separate the high-power analog components supported by a first board from any additional low power digital components of the controller 100. For example, as shown in FIG. 2, the controller 100 may further include a second PCB 210 that accommodates low-power digital components and signals. However, it should be noted that in some embodiments, the high-power analog components and signals and the low-power digital components and signals are accommodated by a single PCB. Regardless of whether there are one or two boards, according to this exemplary embodiment similar processing, control, and power generation for each of the three phases is maintained entirely on the first PCB 200. That is, a separate board or module for each phase, and thus each respective regulator control 110A-110C, is not needed according to this embodiment because all processing and power generation for the tap changers associated with all three phases can be handled on the first PCB 200.

Figure 3:
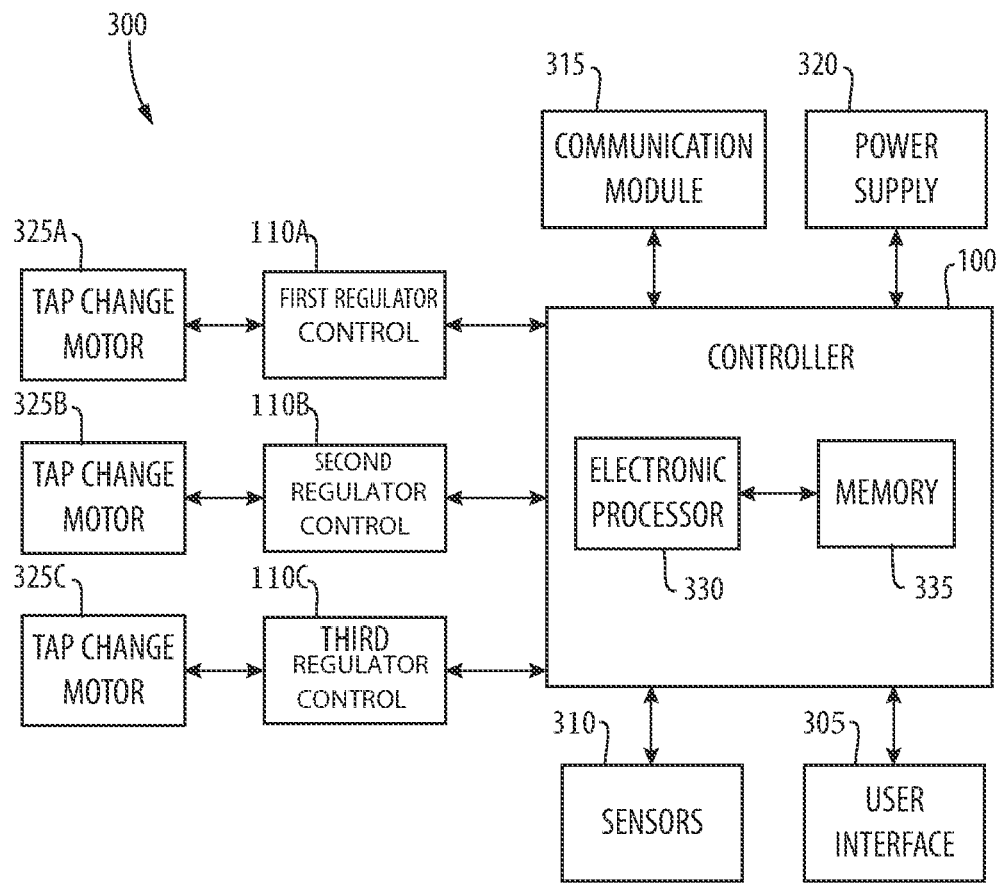
FIG. 3 is a block diagram of a control system of a multi-phase voltage regulator control system according to some embodiments.

FIG. 3 illustrates an example block diagram of a control system 300 of an exemplary tap changing system used for a three-phase power system, according to some embodiments. The control system 300 includes the controller 100 which is electrically and/or communicatively connected to a variety of modules or components of the control system 300. For example, the controller 100 is connected to the regulator controls 110A-110C, a user-interface 305, sensors 310, communication module 315, power supply 320, and tap change motors 325A-325C for adjusting voltage tap positions associated with each respective phase in a three-phase power system.

As described above, the controller 100 is configured to communicate with the regulator controls 110A-110C. In particular, the controller 100 may be configured to receive signals from and/or send signals to the regulator controls 110A-110C when a user operates one or more of the mode switches 115A-115C, power switches 120A-120C, and/or tap change switches 125A-125C. For example, the controller 100 may be configured to automatically operate a respective regulator control 110 when the corresponding mode switch is configured to perform automatic mode of operation. Similarly, the controller 100 may be configured to power a particular regulator control 110 with voltage supplied by the phase lines when the corresponding power switch 120 is moved to the external power source setting. Furthermore, when operating in a manual mode of operation, the controller 100 may be configured to raise or lower a particular tap position based on operation of one or more of the tap change switches 125A-125C.

The controller 100 is further configured to communicate with a user-interface 305 and one or more sensors 310. The user-interface 305 includes, for example, the display 130, the control buttons 135, and the various indicator lights 140. The sensors 310 may include one or more voltage sensors used for monitoring the respective voltages of the phase lines, e.g., phases A-C, included in the three-phase power system. The sensors may also include one or more current sensors, one or more temperature sensors, one or more additional voltage sensors, and/or one or more other sensors for monitoring physical and electrical characteristics of the tap changing system.

The communication module 315 is configured to provide communication between the controller 100 and one or more external devices (for example, a smart phone, a tablet, a laptop, etc.) in a three-phase power system. In some embodiments, the communication module 315 includes the USB interface 145 and the smart flash SD card interface 150. In some embodiments, the communication module 315 includes one or more wireless and/or wired transmitters, receivers, and/or transceivers used for communicating with external devices. In some embodiments, the communication module 315 is configured to communicate with external devices operated by a utility service provider and/or a service technician. In such embodiments, the communication module 315 may communicate with the one or more external devices through a network. The network may be, for example, a wide area network (WAN) (e.g., the Internet, a TCP/IP based network, a cellular network, such as, for example, a Global System for Mobile Communications [GSM] network, a General Packet Radio Services [GPRS] network, a Code Division Multiple Access [CDMA] network, an Evolution-Data Optimized [EV-DO] network, an Enhanced Data Rates for GSM Evolution [EDGE] network, a 3 GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network may be, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In some embodiments, the communication module 315 communicates with one or more peripheral devices in a supervisory control and data acquisition (SCADA) management system.

As shown, the control system 300 of the tap changing system further includes a power supply 320 that is electrically and/or communicatively coupled to the controller 100 and other components, such as the regulator controls 110A-110C and tap change motors 325A-325C, included in control system 300. The power supply 320 may be configured to selectively provide power from either an internal power source or an external power source to the various components of the control system 300. In some embodiments, the power supply 320 includes an internal power source, such as a rechargeable battery, which may be used to provide power to one or more components included in the control system 300. For example, the power supply 320 may power the control system 300 with power from the rechargeable battery when one or more of the power switches 120A-120C are set to the internal power source position.

In some embodiments, the power supply 320 is further configured to selectively power components of the control system 300 with power received from an external power source, such as the phase lines included in a three-phase power system. In such embodiments, the power supply 320 may include one or more AC-AC converters, AC-DC converters, and/or DC-DC converters configured to convert the AC power supplied by phase lines to an appropriate level used for powering the one or more components of control system 300.

Figure 4:
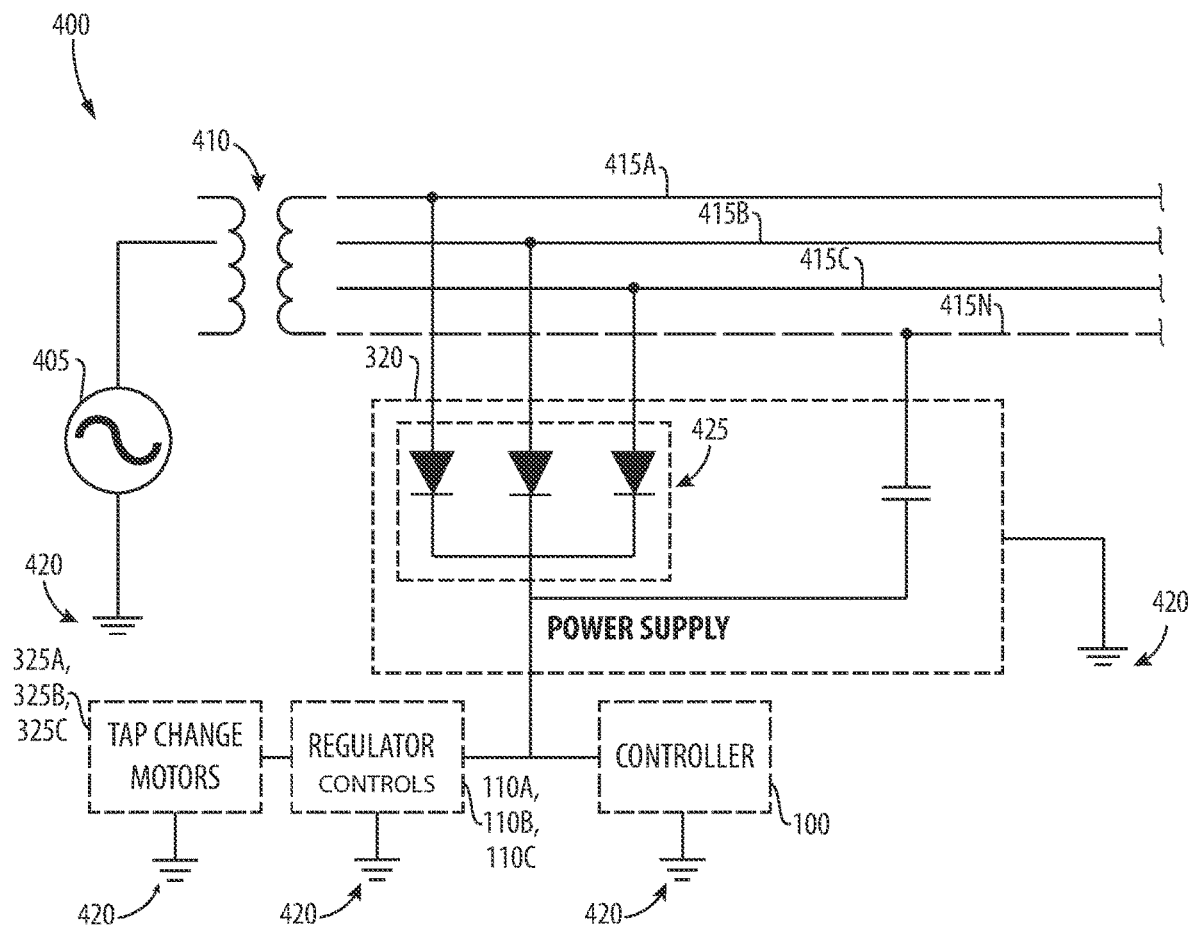
FIG. 4 is a schematic diagram of a multi-phase voltage system according to some embodiments.

For example, FIG. 4 illustrates an embodiment in which the power supply 320 includes converter circuitry that converts power received from a three-phase power system 400 to a level used for powering the control system 300. As shown, the three-phase power system 400 includes a power source 405, a voltage regulator 410, phase lines 415A-415C, neutral line 415N, and ground 420. The power supply 320 includes a converter circuit 425 used for converting the AC power transmitted along phase lines 415A-415C to a level used for powering the controller 100, the regulator controls 110A-110C, tap change motors 325A-325C, and other components of the control system 300. In the illustrated embodiment, the converter circuit 425 is a three-phase half-wave rectifier that is configured to harvest the positive half-cycles of the AC power transmitted by phase lines 415A-415C and use the harvested power to power the control system 300.

For example, when one or more of the power switches 120A-120C are set to the external power source position, the controller 100 may be configured to power one or more of the regulator controls 110A-110C and tap change motors 325A-325C with the positive half-cycles of AC power transmitted along the phase lines 415A-415C. In some instances, the positive half-wave is used for power harvesting. In some instances, other types of converter topologies are used instead of the three-phase half-wave rectifier.

Referring again to FIG. 3, the controller 100 further includes a plurality of electrical and electronic components that provide power, operational control, and protection to the components and modules within the controller 100 and/or the control system 300. For example, the controller 100 includes, among other things, an electronic processor 330 (for example, a microprocessor or another suitable programmable device) and a memory 335. In some embodiments, the electronic processor 330 and/or the memory 335 are mounted to a surface of the first PCB 200. In some embodiments, the electronic processor 330 and/or the memory 335 are embedded within a surface of the first PCB 200. In other embodiments, the electronic processor 330 and/or the memory 335 are otherwise electrically and physically coupled to the first PCB 200. In some embodiments, the electronic processor 330 and/or the memory 335 are supported by the second PCB 210.

The memory 335 includes, for example, a program storage area and a data storage area. The program storage area and the data storage area can include combinations of different types of memory, such as read-only memory (ROM) and random-access memory (RAM). Various non-transitory computer readable media, for example, magnetic, optical, physical, or electronic memory may be used. The electronic processor 330 is communicatively coupled to the memory 330 and executes software instructions that are stored in the memory 335, or stored in another non-transitory computer readable medium such as another memory or a disc. The software may include one or more applications, program data, filters, rules, one or more program modules, and other executable instructions. In some embodiments, the memory 335 includes one or more modules configured to perform various functions of controller 100. For example, memory 335 may include a voltage comparator module used to analyze voltages of the phase lines 415A-415C. In some embodiments, memory 335 may additionally or alternatively include a tap change module used to generate signals (e.g., raise and/or lower signals) to instruct the tap change motors 325A-325C to change the tap positions based on phase line voltage measurements. In some embodiments, memory 335 may additionally or alternatively include a tap change module used to generate signals (e.g., raise and/or lower signals) to instruct the tap change motors 325A-325C to change the tap positions based on positions of the tap change switches 125A-125C.

Figure 5A:
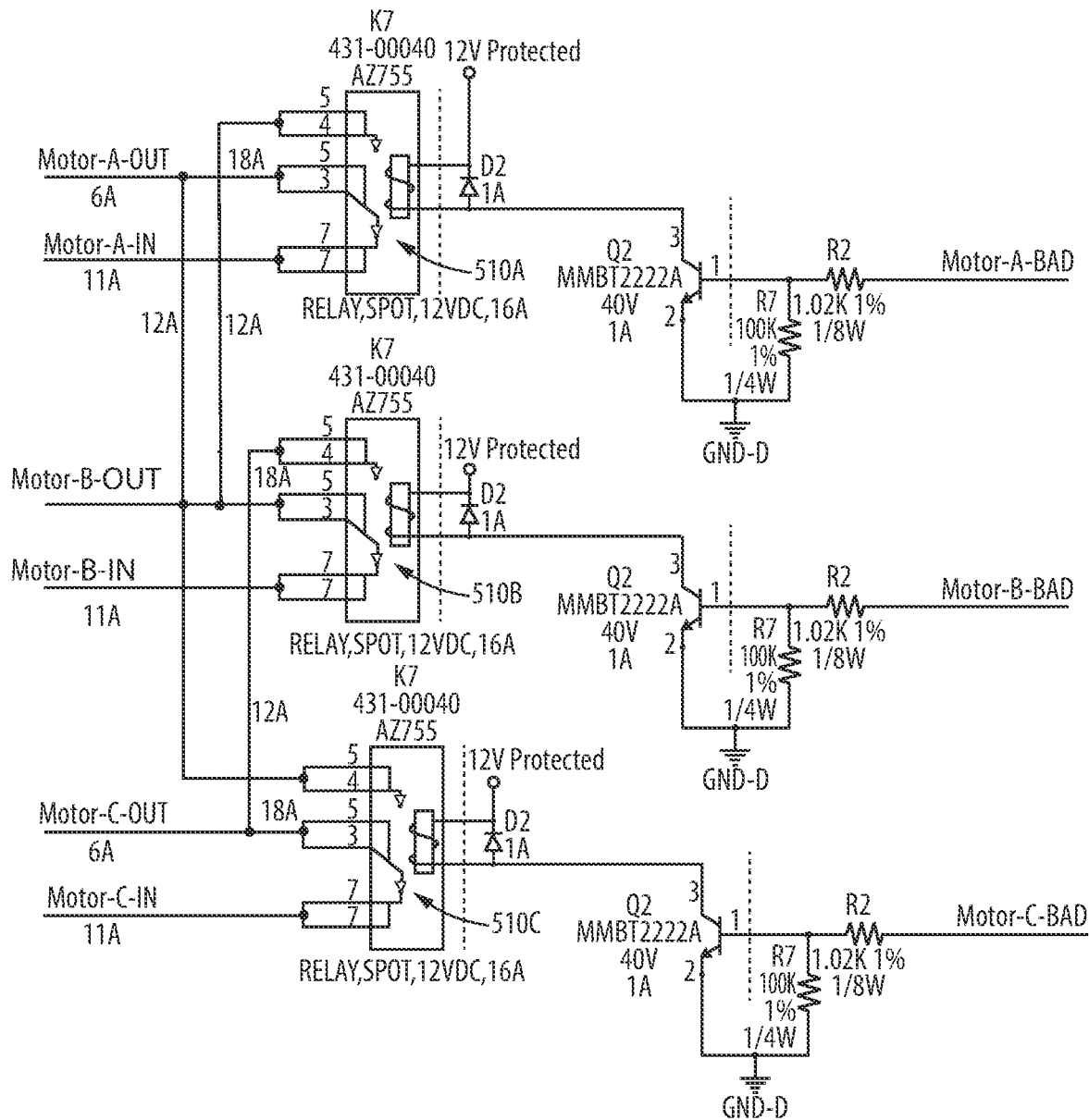
FIGS. 5A and 5B illustrate schematic drawings of a power circuit for tap change motors according to some embodiments.
Figure 5B:
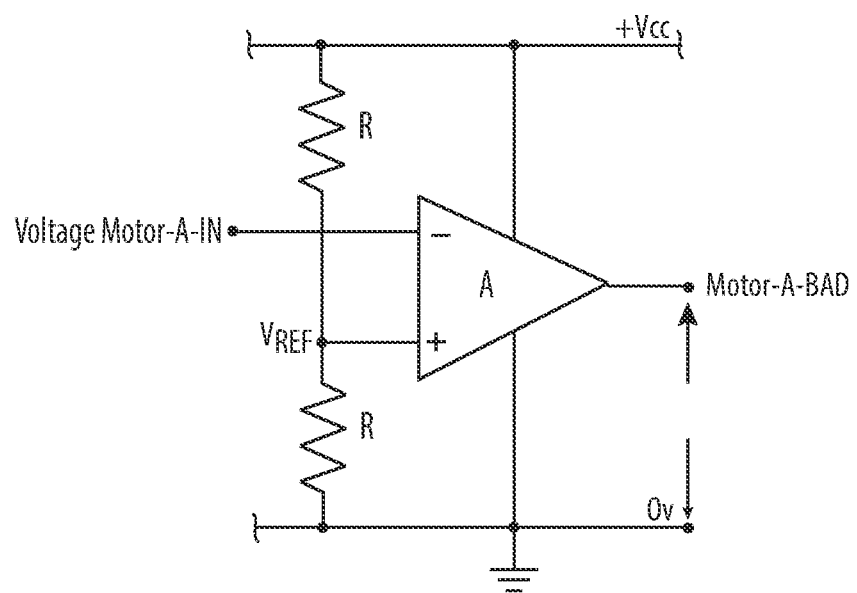

FIGS. 5A and 5B illustrate an exemplary schematic demonstrating how power is supplied to each of the tap change motors 325A-325C when the controller 100 determines that the voltage of one or more phases, such as the voltage on one or more of the phase lines 415A-415C, needs to be raised or lowered. As shown, power is provided to the tap change motors 325A-325C of each phase even when AC power for any one or more of the phases is de-energized, for example, for maintenance reasons or due to a line failure. It is desired to change the tap positions of each phase, that is, in accordance with the commanded power determined by the controller 100 and/or regulator controls 110A-110C, even when one or more of the phase lines 415A-415C is dead, so the dead phase is set to the appropriate tap setting when that particular phase is restored. Otherwise, the power distribution system 400 may be unbalanced and operate inefficiently or exhibit other detrimental properties.

As shown in FIG. 5B, signal Motor-A-BAD, which corresponds to phase-A (e.g., phase line 415A) of a three-phase power system 400, is output from a voltage comparator 505A that compares Motor-A-IN input voltage to a reference voltage, Vref. If the Motor-A-IN input voltage exceeds Vref, the output Motor-A-BAD signal will become low, indicating that there is sufficient voltage on the phase line 415A. Thus, under this condition the phase-A tap change motor 325A has sufficient power and can facilitate a tap change. If, to the contrary, the Motor-A-IN input voltage does not exceed Vref, the Motor-A-BAD output from the voltage comparator would be high, indicating there is not enough power on phase line 415A to power the tap change motor 325A. It is noted, although not expressly shown in the figures, output signals Motor-B-BAD and Motor-C-BAD, corresponding to phase-B (e.g., phase line 415B) and phase-C (e.g., phase line 415C), are generated in a similar manner as described for signal Motor-A-BAD. As shown in FIG. 5B, the output voltage of the comparator is inverted to produce the appropriate logic to match the truth table illustrated in FIG. 5A.

The logic chart below the schematic diagram in FIG. 5A will now be described in accordance with one or more exemplary embodiments. For example, according to one possible scenario, if all three phases (e.g., phase lines 415A-415C) of the three-phase power system 400 have sufficient respective transmission voltages, then, as shown in the last row of the logic chart of FIG. 5A, each "Motor IN" signal, i.e., Motor-A-IN, Motor-B-IN and Motor-C-IN, is at logic "1." It should be noted that a sufficient transmission voltage need not necessarily be the correct voltage pursuant to the present load requirements and as commanded by the controller 100, but rather a voltage sufficiently high enough to exceed Vref, as described in reference to FIG. 5B. Consequently, because each of the input voltages is high enough, e.g., non-zero which would indicate an open circuit as would be the case if a particular phase voltage were offline, the corresponding "Motor BAD" signals, Motor-A-BAD, Motor-B-BAD and Motor-C-BAD, are at logic "0." It should be noted that logic "0" in reference to the Motor BAD signals means that the respective signals are at a low potential. In fact, as described above, when any of the Motor BAD signals are "low," this indicates that the respective phase line 415 has sufficient power to drive the corresponding tap change motor 325.

Further, under the circumstances just described where each phase line has enough voltage, each respective relay 510A-510C shown in FIG. 5A is controlled such that the Motor-IN input voltage is delivered to the corresponding Motor-OUT. For example, the relay 510A in the phase-A path is controlled such that Motor-A-IN is electrically connected to the Motor-A-OUT signal. Similarly, Motor-B-IN is electrically connected to Motor-B-OUT and Motor-C-IN is connected to Motor-C-OUT. This condition is illustrated in the logic chart by the MOTOR POWER INPUT columns, Motor-A-IN, Motor-B-IN, Motor-C-IN, having a "1,1,1" condition. Accordingly, the LOGIC OUTPUT columns, Motor-A-BAD, Motor-B-BAD, Motor-C-BAD, have a "0,0,0" condition and the MOTOR POWER OUTPUT columns, Motor-A-OUT, Motor-B-OUT, Motor-C-OUT, have an "A, B, C" condition when each respective phase line 415 has sufficient power to drive the corresponding tap change motor 325. Accordingly, power for the tap change motors 325A-325B is provided by each regulator control 110A-110C on each individual phase.

If, on the other hand, one of the three phase lines 415A-415C does not have a sufficient voltage potential (e.g., voltage is less than a threshold for minimum voltage needed to power tap change motor 325), then the corresponding relay circuit 510A-510C is controlled such that the tap change motor 325A-325C for that phase is powered by one of the other phase lines that does have sufficient voltage (e.g., voltage exceeds a minimum threshold needed to power the tap change motor 325). For example, phase lines 415A and 415B may have sufficient voltage, but phase line 415C does not have sufficient voltage. This condition is illustrated in the second to last row of the chart and may exist if, for example, phase line 415C was taken offline or experienced a failure. Under these conditions, tap change motor 325A is supplied with power from phase line 415A, tap change motor 325B is supplied with power from phase line 415B, and tap change motor 325C is supplied with power from phase line 415A.

Specifically, the relays 510A-510C shown in FIG. 5A are controlled such that Motor-A-IN is electrically connected to the Motor-A-OUT signal and Motor-B-IN is electrically connected to Motor-B-OUT. In this scenario, however, Motor-A-OUT is also connected to Motor-C-OUT, since phase line 415C is dead and Motor-C-IN has insufficient voltage to drive the tap change motor 325C. This condition is illustrated in the logic chart by the MOTOR POWER INPUT columns, Motor-A-IN, Motor-B-IN, Motor-C-IN, having a "1,1,0" condition. Accordingly, the LOGIC OUTPUT columns, Motor-A-BAD, Motor-B-BAD, Motor-C-BAD, have a "0,0,1" and the MOTOR POWER OUTPUT columns, Motor-A-OUT, Motor-B-OUT, Motor-C-OUT, have an "A, B, A" condition.

Other possible conditions where one or more phase lines 415A-415C are insufficient to power their respective tap change motors 325A-325C are further depicted in the logic chart. That is, it is shown where each of the tap change motors 325A-325C for the one or more dead phases would receive power. Furthermore, in some embodiments, the tap change motors 325A-325C are not powered solely by the phase line 415A-415C to which they are connected. In some embodiments, the tap change motors 325A-325C may be powered by the combined rectified positive half-wave cycles of the phase lines 415A-415C. In some embodiments, negative half-wave cycles of the phase lines 415A-415C are harvested for powering the system instead of or in addition to the negative half-wave cycles.

As described above, when one or more of the mode switches 115A-115C are set to an automatic mode of operation, the controller 100 is configured to, using the regulator controls 110A-110C, control the tap change motors 325A-325C to automatically adjust the tap positions. The controller 100 automatically adjusts tap positions to bring the voltage of the three-phase power system 400 within a target band (e.g., within a desired voltage range) of a voltage setpoint, or bandcenter. In some embodiments, the controller 100 is configured implement an "Independent Phase Independent Operation" control method for controlling the tap positions for each phase line 415A-415C. In such embodiments, the controller 100 controls the tap position for a particular phase according to a respective setpoint and compensated voltage associated with that particular phase. For example, the controller 100 controls the tap position of phase A based on a phase A voltage setpoint and the respective compensated voltage of phase A. In some embodiments, the controller 100 is configured to implement a "Multi-Phase Independent Operation" control method for controlling the tap positions for each phase line 415A-415C. In such embodiments, the controller 100 controls the tap position for a particular phase according to a multi-phase setpoint and a respective compensated voltage associated with the particular phase being adjusted. For example, the controller 100 controls the tap position of phase A based on a multi-phase setpoint and the respective compensated voltage of phase A. The multi-phase setpoint may be, for example, a target bandcenter and/or voltage band for the multi-phase voltage of system 400.

In some embodiments, the controller 100 is configured to regulate the voltage of the three-phase power system 400 by implementing a "Ganged Average Mode" control method. While implementing the "Ganged Average Mode" control method, the controller 100 controls the tap positions for each phase line 415A-415C using the same multi-phase setpoint and an average compensated voltage of the system 400, which is calculated based on the respective voltages of all three phases. That is, the controller 100 controls, using the regulator controls 110A-110C, the tap positions for all three phases based on the same multi-phase setpoint and average compensated voltage, not based on individual phase voltage setpoints or compensated phase voltages that are unique to a particular phase. By using the same multi-phase setpoint and average compensated voltage to control the tap positions, the controller 100 effectively moves the taps that are positioned at a maximum or minimum setpoint toward a voltage bandcenter to thereby bring the system voltage within a target band.

Figure 6:
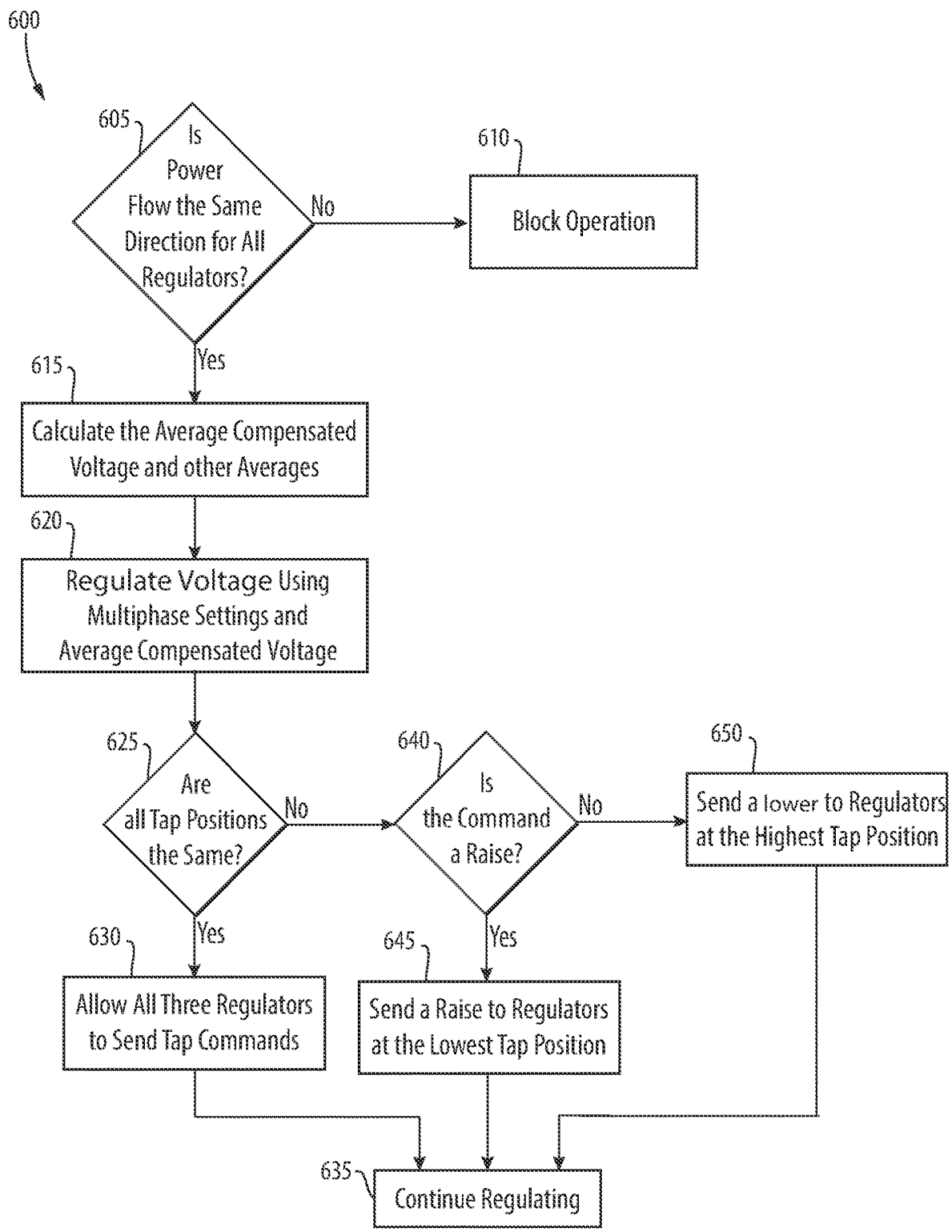
FIG. 6 is a flowchart illustrating a first example process or operation of a multi-phase voltage regulator controller according to some embodiments.

FIG. 6 is a flowchart illustrating a process, or operation, 600 for regulating system voltage (e.g., controlling tap positions) in accordance with the "Ganged Average Mode" control method. Although illustrated as occurring sequentially, some of the steps may be performed in parallel. At block 605, the controller 100 determines whether power flow is in the same direction for all the regulator controls 110A-110C (block 605). If the controller 100 determines that power flow is not in the same direction for each of the voltage regulator controls 110A-110C, the controller 100 blocks operation of the "Ganged Average Mode" control method (block 610). In some instances, blocking operation at block 610 includes changing the voltage regulation method, by the controller 100, to the "Multi-Phase Independent Operation" control method to regulate the system voltage.

If the controller 100 determines that power flow is in the same direction for each of the voltage regulator controls 110A-110C, the controller 100 calculates an average compensated voltage of the three-phase power system 400 (block 615). As described above, the average compensated voltage is calculated based on the respective voltages of each phase. At block 620, the controller 100 runs a voltage regulation task based on the determined average compensated voltage and the multi-phase setpoint (block 620). The multi-phase setpoint is used for controlling the tap positions for all phases and may include, for example, a target bandcenter voltage and/or voltage band for the three-phase power system 400. Running the voltage regulation task includes determining whether to issue one of a raise command or a lower command based on the average compensated voltage and the multi-phase setpoint. That is, at block 620, the controller 100 determines a voltage regulation operation, such as issuing a raise command or a lower command, based on the average compensated voltage of the system 400 and the multi-phase setpoint. For example, if the average compensated voltage of the system 400 exceeds the multi-phase setpoint, the controller 100 might determine to issue a lower command. Likewise, if the average compensated voltage of the system 400 is less than the multi-phase setpoint, the controller 100 might determine to issue a raise command.

At block 625, the controller 100 determines whether each of the regulator controls 110A-110C are set to the same voltage tap position before issuing the determined command to the regulator controls 110A-110C (block 625). If the voltage regulator controls 110A-110C are set to the same tap positions, the controller 100 issues the determined command, such as a raise command or a lower command, to all three voltage regulator controls 110A-110C (block 630). A raise command issued to all three voltage regulator controls 110A-110C may be referred to as a "ganged raise command issued" and a lower command issued to all three voltage regulator controls 110A-110C may be referred to as a "ganged lower command." A ganged command issued to the regulator controls 110A-110C causes each of the tap change motors 325A-325C to be operated in accordance with the ganged command. After issuing the ganged raise command or the ganged lower command to all three voltage regulator controls 110A-110C, the controller 100 continues to regulate the system voltage (block 635). For example, the controller 100 repeats the process 600 to continue regulating the voltage of the three-phase power system 400.

However, if the voltage regulators 110A-110C are not set to the same tap position at block 625, the controller 100 determines whether the regulation operation determined at block 620 is a raise command (block 640). Moreover, the controller 100 evaluates the tap position of each respective regulator control 110A-110C in relation to the tap position of the other two regulator controls 110A-110C before issuing a command to one or more of the voltage regulator controls 110A-110C (block 640). If the controller 100 determines that the command is a raise command, the controller 100 issues a raise command to the regulator control(s) 110A-110C having the lowest tap positions (block 645). However, if the controller 100 determines that the command is a lower command, the controller 100 issues a lower command to the one or more voltage regulator controls 110A-110C having the highest tap positions (block 650). After issuing the lower command(s) at block 645 or 16ssueng the raise command(s) at block 650, the controller 100 continues to regulate the system voltage (block 635).

In a first example provided with respect to process 600, it will be assumed that at block 640, the controller 100 determines that a raise command was issued and that regulator control 110A is set to tap position 8R, regulator control 110B is set to tap position 8R, and regulator control 110C is set to tap position 6R. In such an example, since the voltage regulator control 110C is set to the lowest tap position, the controller 100 will issue a raise command to the regulator control 110C for raising the tap position of phase C (block 645). After the controller 100 increases, using regulator control 110C, the tap position of phase C from 6R to 7R, the controller 100 then proceeds to continue regulating the voltage of system 400 (block 635).

Continuing with this first example, the controller 100 might continue regulating the multi-phase voltage of the distribution system by restarting the process 600. In this example, performing process 600 would again lead to controller 100 arriving at block 640, as the taps are still at different tap positions (e.g., regulator control 110A is set to tap position 8R, regulator control 110B is set to tap position 8R, and regulator 110C is now set to tap position 7R). Thus, if the controller 100 determines at block 640 that the issued command is another raise command, the controller 100 would again issue a raise command to the regulator control 110C for raising the tap position of phase C (block 645). After the controller 100 increases, using the regulator control 110C, the tap position of the phase C from 7R to 8R, the controller 100 then proceeds to continue regulating the multi-phase voltage of the distribution system 400 (block 635). Continuing with this first example yet again, all three regulator controls 110A-110C are now set to the same tap position of 8R. Thus, when performing the process 600 a third time, the controller 100 would proceed from block 625 to block 630, at which the controller 100 would issue a ganged command to all three regulator controls 110A-110C. For example, if the controller 100 determines at block 620 that another raise command is needed to bring the system voltage within band, the controller 100 would then issue a ganged raise command to all three regulator controls 110A-110C at block 630. In operation, the controller 100 may continue to perform the process 600 until the target multi-phase setpoint is satisfied.

As a second example provided with respect to process 600, it will be assumed that at block 640, the controller 100 determines that a raise command was issued and that regulator control 110A is set to tap position 6R, regulator control 110B is set to tap position 7R, and regulator control 110C is set to tap position 8R, the controller 100. In such an example, since the regulator control 110A is set to the lowest tap position, the controller 100 will issue a raise command to the regulator control 110A for raising the tap position of phase A (block 645). After the controller 100 increases, using regulator control 110A, the tap position of the phase A from 6R to 7R, the controller 100 then proceeds to continue regulating the multi-phase voltage of the system 400 (block 635).

Continuing with this second example, the controller 100 might continue regulating the multi-phase voltage of the distribution system by restarting the process 600. In this example, performing process 600 again would lead to controller 100 arriving at block 640, as the taps are still at different tap positions (e.g., regulator control 110A is now set to tap position 7R, regulator control 110B is set to tap position 7R, and regulator control 110C is set to tap position 8R). Thus, if the controller 100 determines at block 640 that the issued command is another raise command, the controller 100 would then issue raise commands to the regulator controls 110A, 110B for respectively raising the tap positions of phases A, B. After the controller 100 increases the tap positions of the phases A, B from 7R to 8R, the controller 100 then proceeds to continue regulating the multi-phase voltage of the system 400 (block 635). Continuing with this second example yet again, all three regulator controls 110A-110C are now set to the same tap position of 8R. Thus, when performing the process 600 a third time, the controller 100 would proceed from block 625 to block 630, at which the controller 100 would issue a ganged command to all three regulator controls 110A-110C. For example, if the controller 100 determines at block 620 that another raise command is needed at to bring the system voltage within band, the controller 100 would then issue a ganged raise command to all three regulator controls 110A-110C at block 630. Although the first and second examples are described with respect to raise commands, similar logic could be applied to scenarios in which lower commands are issued to bring the system voltage within band.

While performing process 600, each individual phase might also be controlled in accordance with voltage setpoint limits and settings that are determined in accordance with phase voltage and current measurements. The setpoint limits may include, for example, user-defined voltage band thresholds and tap position settings. In some cases, a tap position increase or decrease command issued for a particular phase (e.g., phase A) may violate the settings used to govern operation of process 600. In such cases, the controller 100 is configured to stop controlling non-violated phases (e.g., phases B and C) with the "Ganged Average Mode" control method and, instead, begin controlling the non-violated phases using individual phase measurements until the blocking condition is no longer present. Before restoring the "Ganged Average Mode" control method of controlling the tap positions of phases A-C, a 1V hysteresis may be applied.

In some embodiments, the controller 100 is configured to regulate the voltage of the three-phase power system 400 by implementing a "Ganged Controlling Phase Mode" control method. The "Ganged Controlling Phase Mode" control method is similar to the "Ganged Average Mode" control method described above. However, while implementing the "Ganged Controlling Phase Mode" control method, the controller 100 is configured to set a controlling phase (e.g. phase A) that is used to control all of the regulator controls 110A-110C instead of using an average compensated voltage for controlling regulator controls 110A-110C. Accordingly, the controlling phase is used to set the voltage regulation operation (e.g., determine raise or lower command). Thus, if one of the non-controlling phases experiences a change in regulation direction (e.g., raise or lower), either from a power flow change or auto-determination change, the non-controlling phase would still be regulated in the direction of the controlling phase.

Figure 7:
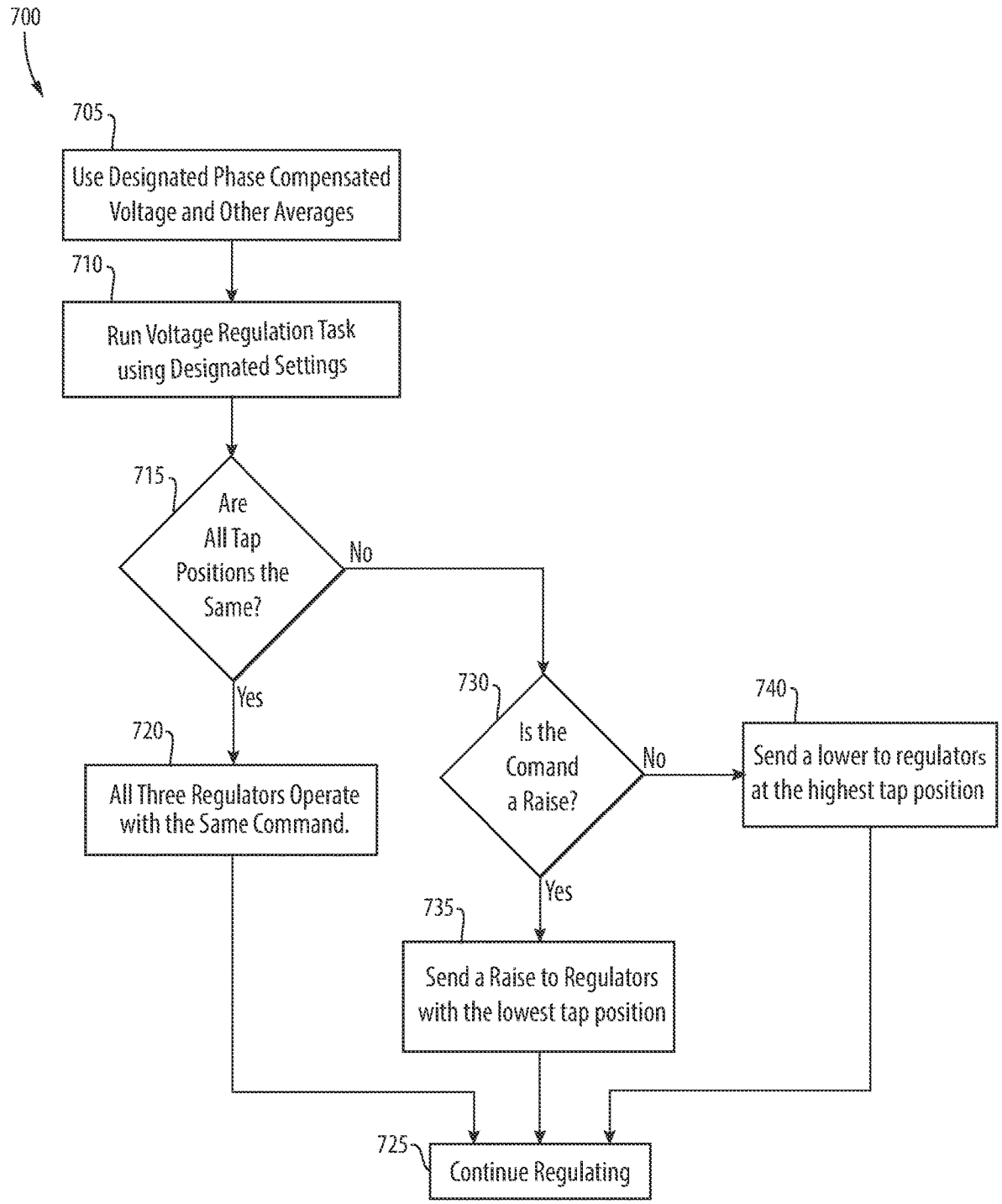
FIG. 7 is a flowchart illustrating a second example process or operation of a multi-phase voltage regulator controller according to some embodiments.

FIG. 7 is a flowchart illustrating a process, or operation, 700 for regulating system voltage (e.g., controlling tap positions) in accordance with the "Ganged Controlling Phase Mode" control method. Although illustrated as occurring sequentially, some of the steps may be performed in parallel. At block 705, the controller 100 designates the controlling phase that will be used to set the voltage regulation operation (block 705). This includes determining the designated phase compensated voltage based on the compensated voltage of the designated controlling phase. In some examples, the controller 100 determines additional values, such as averages and setpoints, associated with the designated controlling phase. At block 710, the controller 100 begins regulating the three-phase voltage system 400 based on the values of the designated controlling phase voltage and designated setpoints (block 710). For example, this includes determining, by the controller 100, a voltage regulation operation based on the designated controlling phase voltage and designated setpoints. As described above with respect to process 600, a voltage regulation operation may be, for example, a raise command or a lower command.

At block 715, the controller 100 determines whether each of the voltage regulators 110A-110C are set to the same tap position before issuing the determined command to the regulator controls 110A-110C (block 715). If the regulator controls 110A-110C are set to the same tap positions, the controller 100 issues a ganged command, such as a ganged raise command or a ganged lower command, to all three regulator controls 110A-110C (block 720). After issuing the ganged command to all three regulator controls 110A-110C, the controller 100 continues to regulate the system voltage (block 725). For example, the controller 100 repeats the process 600 to continue regulating the voltage of the three-phase power system 400.

However, if the regulator controls 110A-110C are not set to the same tap position at block 715, the controller 100 determines whether the regulation operation determined at block 710 is a raise command (block 730). Moreover, the controller 100 evaluates the tap position of each respective regulator control 110A-110C in relation to the tap position of the other two regulator controls 110A-110C before issuing a command to one or more of the regulator controls 110A-110C (block 730). If the controller 100 determines that the command is a raise command, the controller 100 issues a raise command to the regulator control(s) 110A-110C having the lowest tap positions (block 735). After issuing the raise command(s), the controller 100 continues to regulate the system voltage (block 725). However, if the controller 100 determines that the command is a lower command, the controller 100 issues a lower command to the one or more regulator controls 110A-110C having the highest tap positions (block 740). After issuing the lower command(s), the controller 100 continues to regulate the system voltage (block 725).

In some embodiments, the controller 100 is configured to regulate the voltage of system 400 by implementing a "Multi-Phase Average" control method. Similar to the "Ganged Average Mode" control method, while implementing the "Multi-Phase Average" control method, the controller 100 controls the tap positions for each phase line 415A-415C using the same multi-phase setpoint and an average compensated voltage of the system 400. However, when the controller 100 implements the "Multi-Phase Average" control method, control is limited to the phase most out of band of the desired voltage range. That is, unlike the "Ganged Average Mode" control method, the controller 100 does not issue ganged raise command or ganged lower commands to all regulator controls 110A-110C at once. If any of the regulator controls 110A-110C is blocked while implementing the "Multi-Phase Average" control method, the controller 100 will switch from using the "Multi-Phase Average" control method to using the "Multi-Phase Independent Operation" control method for controlling the tap positions.

Figure 8:
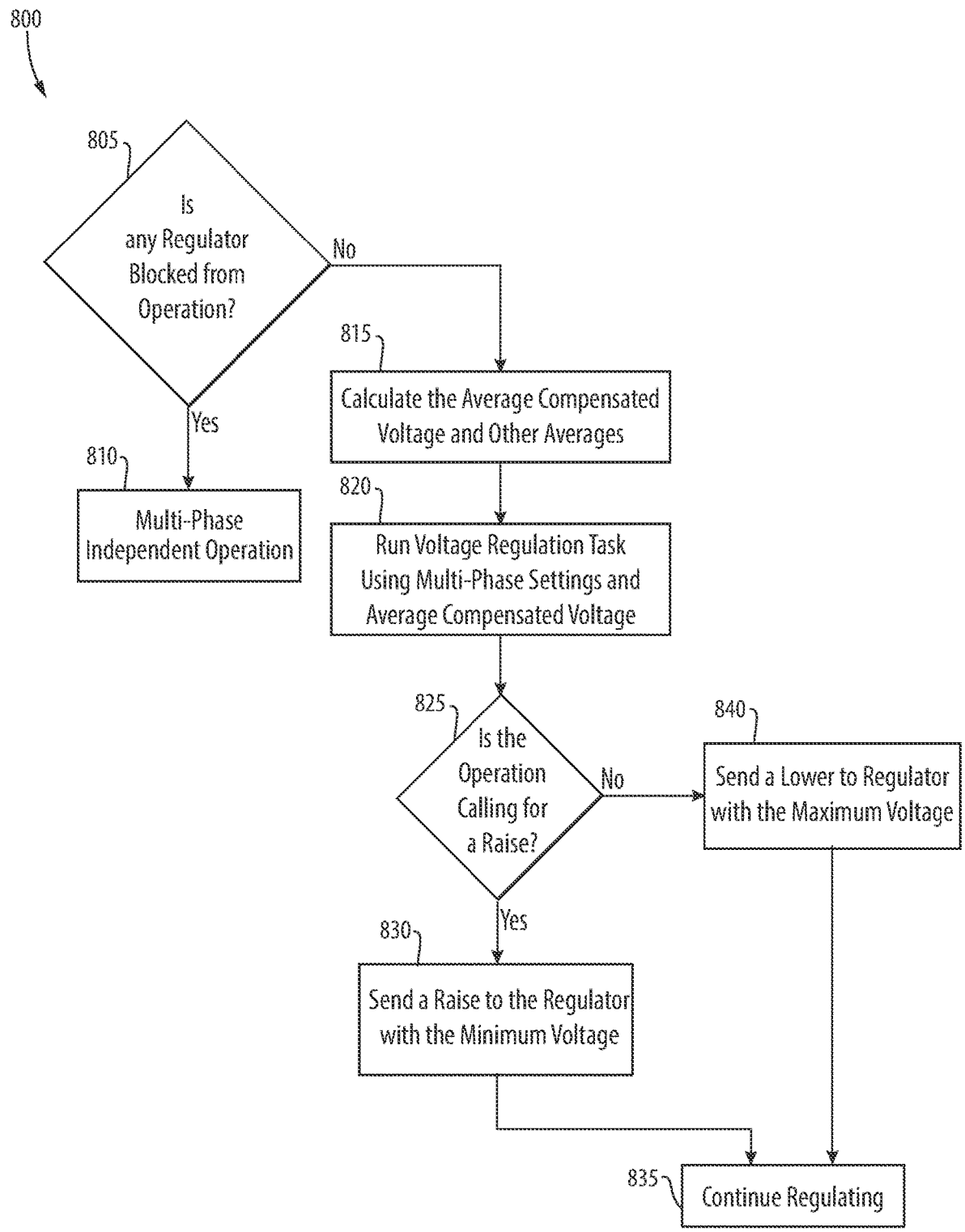
FIG. 8 is a flowchart illustrating a third example process or operation of a multi-phase voltage regulator controller according to some embodiments.

FIG. 8 is a flowchart illustrating a process, or operation, 800 for regulating system voltage (e.g., controlling tap positions) in accordance with the "Multi-Phase Average" control method. Although illustrated as occurring sequentially, some of the steps may be performed in parallel. At block 805, the controller 100 determines whether operation of any of the regulator controls 110A-110C is blocked (block 805). If operation of one or more of the regulator controls 110A-110C is blocked, the controller 100 begins using the "Multi-Phase Independent Operation" control method for regulating the system voltage (block 810). If none of the regulator controls 110A-110C are blocked from operation, the controller 100 calculates an average compensated voltage of the three-phase power system 400 (block 815). As described above, the average compensated voltage is calculated based on the respective voltages of each phase.

At block 820, the controller 100 runs a voltage regulation task based on the determined average compensated voltage and the multi-phase setpoint (block 820). Running the voltage regulation task includes determining whether to issue one of a raise command or a lower command based on the average compensated voltage and the multi-phase setpoint. That is, at block 820, the controller 100 determines a voltage regulation operation, such as issuing a raise command or a lower command, based on the average compensated voltage and multi-phase setpoint that will bring the voltage of the distribution system 400 within band.

At block 825, the controller 100 determines whether the regulation operation determined at block 820 is a raise command (block 825). Moreover, the controller 100 evaluates the respective voltage of each phase in relation to the voltage of the other two phase before issuing a command to one or more of the regulator controls 110A-110C (block 825). If the controller 100 determines that the command is a raise command, the controller 100 issues a raise command to the voltage regulator 110A-110C associated with the phase having the minimum, or lowest, voltage (block 830). After issuing the raise command, the controller 100 continues to regulate the system voltage (block 835). If the controller 100 determines that the command is a lower command, the controller 100 issues a lower command to the regulator control 110A-110C associated with the phase having the maximum, or highest, voltage (block 840). After issuing the lower command, the controller 100 continues to regulate the system voltage (block 835).

As described above, the controller 100 uses the regulator controls 110A-110C to adjust the positions of respective taps based on the voltages of phase lines 415A-415C relative to a voltage bandcenter. For example, when the three-phase voltage of a power system, such three-phase power system 400, decreases below a predefined voltage level that is less than the voltage bandcenter, the controller 100 may be configured to raise, using the regulator controls 110A-110C and the tap change motors 325A-325C, one or more of the voltage tap positions to a point of higher voltage. This has the effect of increasing the system voltage. Similarly, as another example, when the voltage of a power system increases above a predefined voltage level that is greater than the voltage bandcenter, the controller 100 may be configured to lower, using the regulator controls 110A-110C and the tap change motors 325A-325C, one or more of the tap positions to a point of lower voltage. This has the effect of lowering the system voltage.

Figure 9:
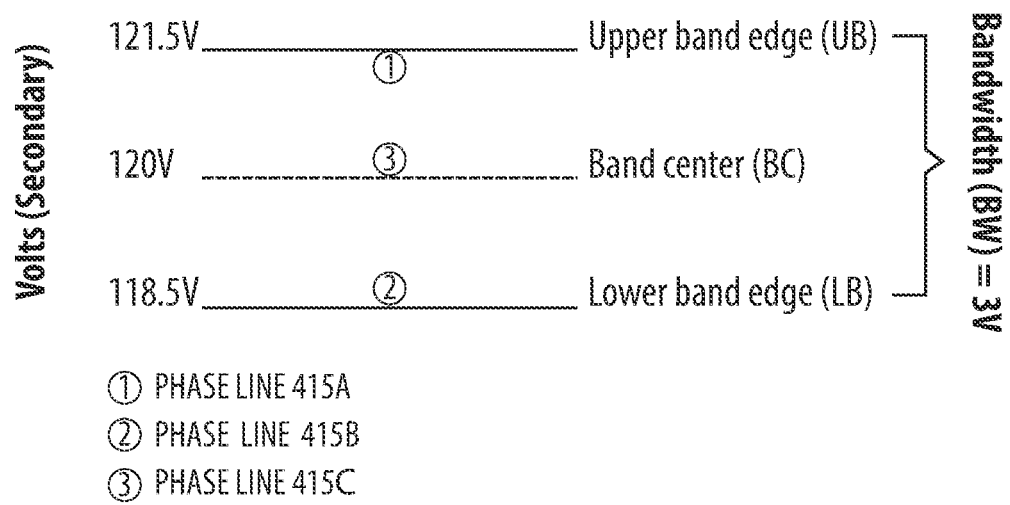
FIG. 9 illustrates an exemplary voltage bandcenter setting according to some embodiments.

The regulator controls 110A-110C, which respectively correspond to phase lines 415A-415C, are generally configured to operate in accordance with the same bandcenter voltage and bandwidth settings. For example, as shown in FIG. 9, the voltage regulator controls 110A-110C may be configured to operate in accordance with a bandcenter voltage of 120 V (normalized with voltage transformer secondary voltage) and a bandwidth of 3 V. For induction motor loads, NEMA MG1 provides guidance on the temperature increase of the motor for unbalance voltage supply voltages, as even small voltage imbalances can result in large current imbalances flowing through the phase lines 415A-415C. For example, a voltage imbalance of 3.5% across phase lines 415A-415C can may result 25% temperature increases in large loads, such as polyphase induction motors.

Various methods, such as the ganged and independent control methods described herein, for regulating system voltage may be used to reduce voltage imbalances occurring within the three-phase power system 400. However, some voltage regulation methods used for controlling the tap positions are ineffective in accounting for a source voltage imbalance that requires the regulator controls 110A-110C to be at different tap positions to obtain balanced three-phase voltages. Also, if the load on each phase line 415A-415C is not balanced and the line drop compensation is used to calculate the load voltage down the feeder using the load current measurement and the line impedance, the regulator controls 110A-110C should be at different taps to obtain balanced voltages. This may be difficult when a voltage regulation method that sets the respective phase taps to the same positions is used.

Figure 10:
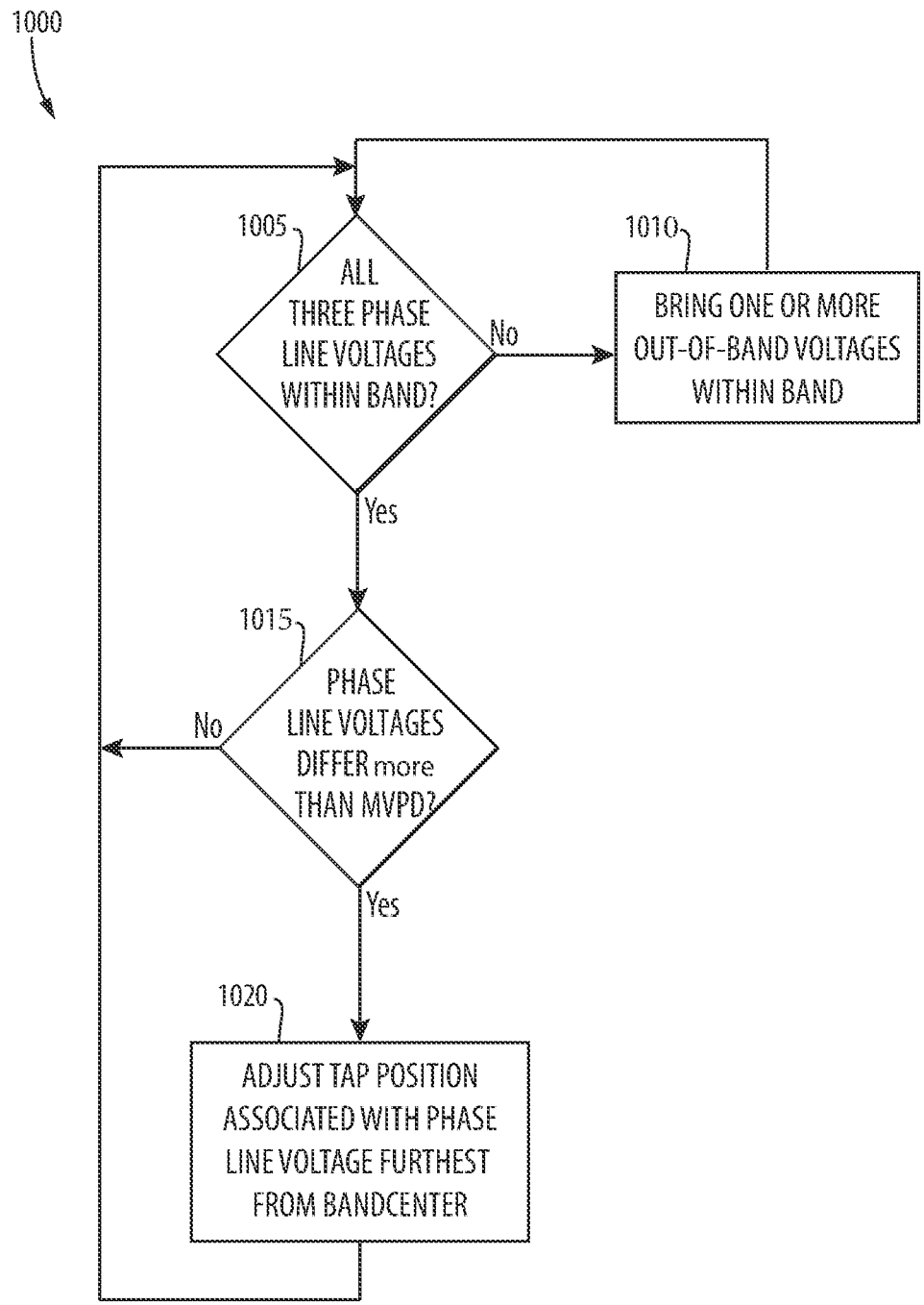
FIG. 10 is a flowchart illustrating a process or operation of reducing voltage imbalances in a multi-phase voltage regulator control system according to some embodiments.

Accordingly, another method for regulating system voltage by controlling the tap positions, as described below, is proposed to reduce the imbalance in voltage supplied to three-phase loads on the system 400. FIG. 10 is a flowchart illustrating a process, or operation, 1000 for reducing the imbalance in voltage supplied to three-phase loads in power system 400. It should be understood that although illustrated as occurring sequentially, some of the steps may be performed in parallel.

The controller 100 determines whether all three phase lines 415A-415C have a voltage that are within a band of the bandcenter voltage (block 1005). For example, with reference to the example illustrated in FIG. 9, the controller 100 determines whether the phase lines 415A-415C are at voltages within a 3 V band centered at 120 V. When one or more of the phase line voltages are not within a band of the bandcenter voltage, the controller 100 performs an operation to bring the out-of-band phase within a band of the bandcenter voltage (block 1010). For example, the controller 100 may use one or more of the voltage regulation methods described above (e.g., "Ganged Average Mode," "Ganged Controlling Phase Mode," "Multi-Phase Average," etc.) to bring the out-of-band phase within a band of the bandcenter.

Figure 11:
FIG. 11 illustrates an exemplary interface for configuring a multi-phase voltage regulator controller.

When all three of the phase line voltages are within a band of the bandcenter voltage, the controller 100 determines whether any voltage difference between the phases (e.g., voltage difference between phase line 415A and 415B, voltage difference between phase line 415A and 415C, and voltage difference between phase line 415B and 415C) exceed a minimize phase voltage differential (MPVD) threshold value (block 1015). For example, as shown in FIG. 11, which illustrates an exemplary interface for configuring the controller 100, the controller 100 may be configured to operate in accordance with an MPVD threshold value equal to 0.5 V. However, it should be understood that other values for the MPVD may be chosen instead.

When a voltage difference between two or more of the phase lines 415A-415C exceeds the MPVD, the controller 100 is configured to reduce the voltage differential by moving the respective voltage tap, using a regulator control 110 and voltage tap motor 325, associated with the phase line 415 that has a voltage furthest from the bandcenter voltage (block 1020). For example, with reference to FIG. 9, the voltage of the first phase line 415A and the voltage of the second phase line 415B both differ from the bandcenter voltage by approximately 1.5 V. In particular, the voltage of the first phase line 415A is 1.5 V greater than the bandcenter voltage and the voltage of the second phase line 415B is 1.5 V less than the bandcenter voltage. Accordingly, the controller 100 controls the regulator control 110A to lower the tap position associated with phase line 415A. Similarly, the controller 100 controls the regulator control 110B to raise the tap position associated with phase line 415B. In some embodiments, the voltage tap positions are not moved until the completion of a set time delay. The controller 100 may continue to perform process 1000 until none of the voltage differences between the phases (e.g., voltage difference between phase line 415A and 415B, voltage difference between phase line 415A and 415C, and voltage difference between phase line 415B and 415C) exceed the MPVD threshold value.

In an alternative embodiment of the method for reducing the imbalance in voltage supplied to three-phase loads, the controller 100 may be configured to calculate the respective voltage difference between each phase line 415A-415C and the bandcenter voltage instead of calculating voltage differences between the phase lines 415A-415C. For example, the controller 100 may be configured to calculate the voltage difference between phase line 415A and the bandcenter voltage, the voltage difference between phase line 415B and the bandcenter voltage, and the voltage difference between phase line 415C and the bandcenter voltage. In such embodiments, the controller 100 then compares the voltage differences between phase lines 415A-415C and the bandcenter voltage to the MPVD threshold before raising or lower voltage tap positions.

Figure 12:
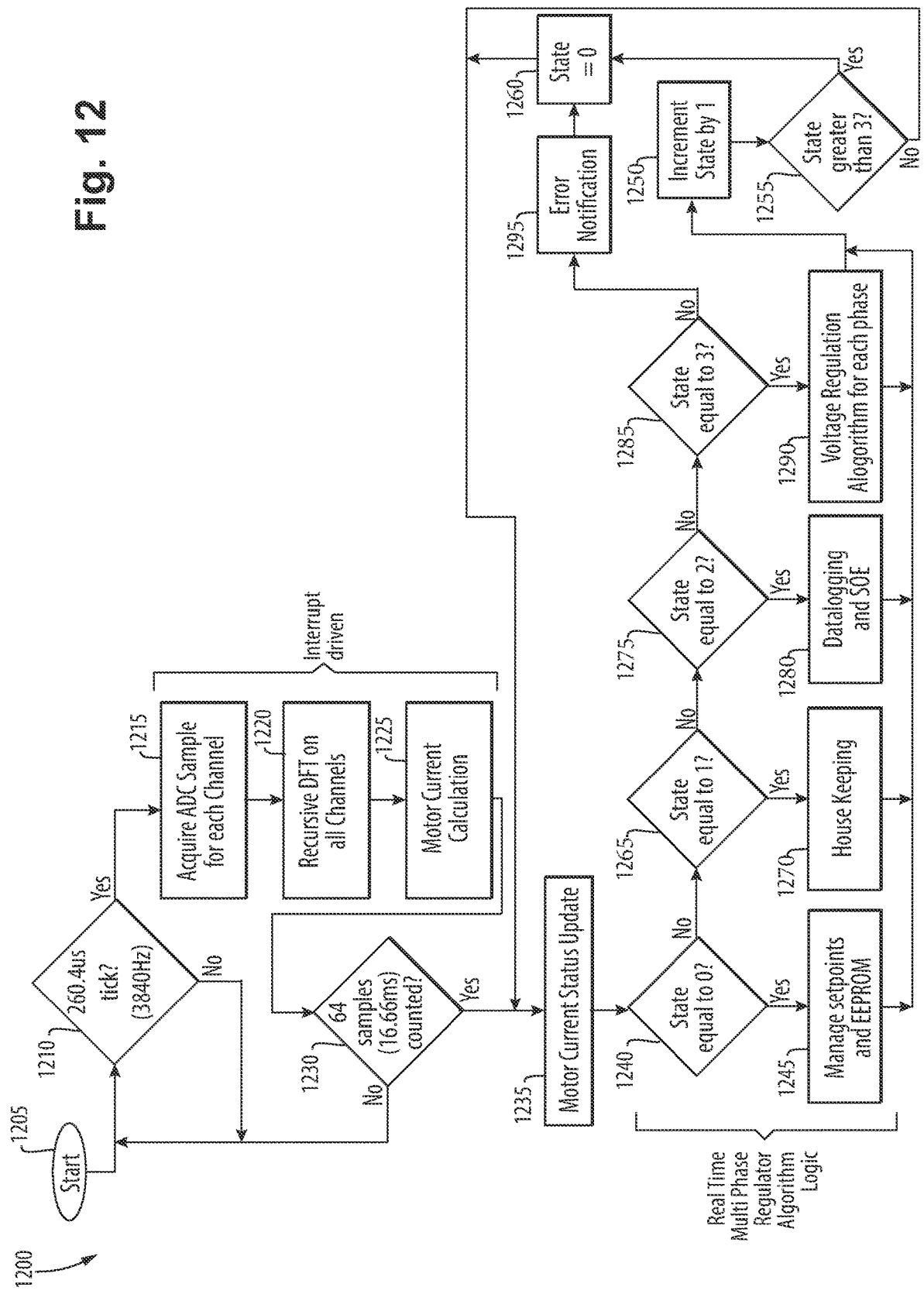
FIG. 12 a flowchart illustrating a fourth example process or operation of a multi-phase voltage regulator controller according to some embodiments.

FIG. 12 is flowchart that illustrates another example method, or process, 1200 for regulating voltage of a three-phase power system, such as the three-phase power system 400. It should be understood that although illustrated as occurring sequentially, some of the steps may be performed in parallel.

At block 1205, the controller 100 starts the process 1200 (block 1205). At block 1210, the controller 100 determines whether a target clock cycle condition, for example a clock cycle tick of 260.4 microseconds, is met (block 1210). If the target clock cycle condition is met, the controller 100 performs an interrupt driven service routine (blocks 1215-1225). At block 1215, the controller 100 samples each analog channel feed, and correspondingly, converts the sampled analog signals to digital signals (block 1215). At block 1220, the controller 100 applies a recursive discrete fourier transform (DFT) to each channel feed input (block 1220). At block 1225, the controller 100 calculates the current flowing through the tap change motors 325A-325C (block 1225).

At block 1230, the controller 100 determines whether a target number of samples, such as 64 samples, have been counted (block 1230). If the target number of samples have not been counted, the controller 100 returns to block 1210. If the target number of samples have been counted, the controller 100 performs a status update for one or more of the tap change motors 325A-325C (block 1235). Performing the status update might include checking the value(s) of the current flowing through one or more of the tap change motors 325A-325C.

At block 1240, the controller 100 determines whether the state of one or more of the tap change motors 325A-325C is equal to zero (block 1240). If, at block 1240, the controller 100 determines that the state of one or more of the tap change motors 325A-325C is zero, the controller 100 performs a first routine to manage the voltage setpoints of the system and manage the status of electrically erasable programmable read-only memory (EEPROM) coupled to controller 100 (block 1245). After block 1245, the controller 100 increments the state of the one or more tap change motors 325A-325C by one (block 1250) and determines whether the updated state of the one or more tap change motors 325A-325C is greater than three (block 1255). If the state of one or more of the tap change motors 325A-325C is greater than three, the controller 100 sets the state of the one or more tap change motors 325A-325C to zero (block 1260) before returning to block 1235. If the state of one or more of the tap change motors 325A-325C is not greater than three, the controller 100 returns to block 1235.

Referring back to block 1240, if the controller 100 determines that the state of one or more of the tap change motors 325A-325C is not equal to zero, the controller 100 determines whether the state of one or more of the tap change motors 325A-325C is equal to one (block 1265). If, at block 1265, the controller 100 determines that the state of one or more of the tap change motors 325A-325C is equal to one, the controller 100 performs one or more housekeeping tasks (block 1270) and proceeds to block 1250. If, at block 1265, the controller 100 determines that the state of one or more of the tap change motors 325A-325C is not equal to one, the controller 100 determines whether the state of one or more of the tap change motors 325A-325C is equal to two (block 1275).

If, at block 1275, the controller 100 determines that the state of one or more of the tap change motors 325A-325C is equal to two, the controller 100 performs one or more datalogging tasks (block 1280) and proceeds to block 1250. If, at block 1275, the controller 100 determines that the state of one or more of the tap change motors 325A-325C is not equal to two, the controller 100 determines whether the state of one or more of the tap change motors 325A-325C is equal to three (block 1285).

If, at block 1285, the controller 100 determines that the state of one or more of the tap change motors 325A-325C is equal to three, the controller 100 performs one or more voltage regulation routines for each phase (block 1290). For example, the controller 100 uses one or more of the voltage regulation methods described herein to regulate the voltage. After regulating the phase voltages, the controller 100 proceeds to block 1250. If, at block 1285, the controller 100 determines that the state of one or more of the tap change motors 325A-325C is not equal to three, the controller 100 outputs an error notification (block 1295) before proceeding to block 1260.

Figure 13:
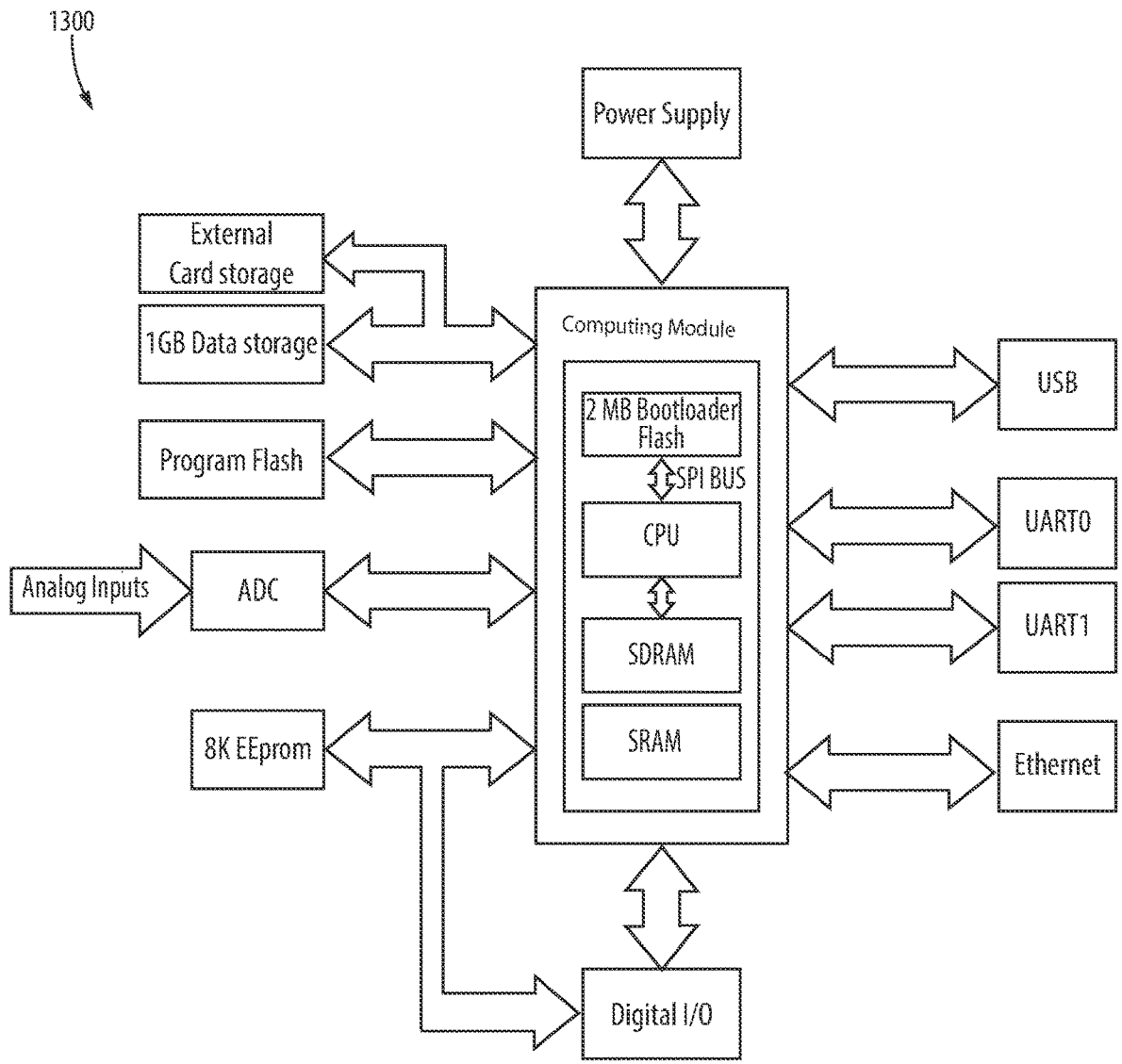
FIG. 13 illustrates a block diagram of an exemplary multi-phase voltage regulator controller according to some embodiments.

FIG. 13 illustrates a block diagram 1300 of an example hardware architecture that may be used to implement one or more of the voltage regulation methods described herein. It should be understood that the hardware architecture illustrated in FIG. 13 is provided merely as an example and is not intended to limit the scope of the multi-phase voltage regulation methods described herein in any way. As shown, the hardware architecture includes a computing module having a processor (CPU) that is coupled to a secure flash bootloader, secure dynamic random access memory (SDRAM), and static random access memory (SRAM). The computing module is connected to additional storage components including an external storage card, data storage, and program flash storage.

The hardware architecture further includes a power supply and various communication components that are connected to the computing module. For example, the communication components include first and second universal asynchronous receiver-transmitters (UART), an ethernet port, and a universal serial bus (USB). Furthermore, the hardware architecture includes an ADC for converting analog inputs to the computing module, EEPROM for storing current settings of the system, and a digital input/output interface.

In the foregoing specification, specific examples, features, and aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A control system for a multi-phase power system including a first phase line, a second phase line, and a third phase line, the control system comprising:
    a first regulator control configured to control a first tap changer;
    a second regulator control configured to control a second tap changer;
    a third regulator control configured to control a third tap changer, each of the first tap changer, the second tap changer, and the third tap changer associated with a respective phase line;
    a converter circuit configured to convert power flowing through the first, second, and third phase lines to levels used for powering the first, second, and third tap changers; and
    an electronic processor coupled to the first regulator control, the second regulator control, and the third regulator control, the electronic processor configured to:
        determine whether a voltage level of the first phase line exceeds a threshold;
        control a first relay to power the first tap changer with power converted from the first phase line to affect a tap change on the first phase line when the voltage level of the first phase line exceeds the threshold; and
        control a second relay to power the first tap changer with power converted from the second phase line to affect a tap change on the first phase line when the voltage of the first phase line does not exceed the threshold.

2. The control system of claim 1, wherein the electronic processor is further configured to:
    determine whether a voltage level of the second phase line exceeds the threshold when the voltage level of the first phase line does not exceed the threshold;
    determine whether a voltage level of the third phase line exceeds the threshold when the voltage level of the second phase line does not exceed the threshold; and
    control a third relay to power the first tap changer with power converted from the third phase line to affect a tap change on the first phase line when the voltage of the first phase line does not exceed the threshold, the voltage of the second phase line does not exceed the threshold, and the voltage of the third phase line exceeds the threshold.

3. The control system of claim 2, wherein the electronic processor is further configured to:
    control the third relay to power the second tap changer with power converted from the third phase line to affect a tap change on the second phase line when the voltage of the second phase line does not exceed the threshold and the voltage of the third phase line exceeds the threshold.

4. The control system of claim 3, wherein the electronic processor is further configured to:
control the third relay to power the third tap changer with power converted from the third phase line to affect a tap change on the third phase line when voltage of the third phase line exceeds the threshold.

5. The control system of claim 1, wherein the converter circuit harvests positive half cycles of the power flowing through the first, second, and third phase lines to power the first, second, and third tap changers.

6. The control system of claim 1, wherein the first regulator control, the second regulator control, and the third regulator control are supported on a single printed circuit board (PCB) that is coupled to the electronic processor.

7. The control system of claim 1, further comprising a front panel including:
a first sub-panel associated with first regulator control;
a second sub-panel associated with the second regulator control; and
a third sub-pan associated with the third regulator control.

8. A control system for a multi-phase power system including a first phase line, a second phase line, and a third phase line, the control system comprising:
a first regulator control configured to control a first tap changer;
a second regulator control configured to control a second tap changer;
a third regulator control configured to control a third tap changer, each of the first tap changer, the second tap changer, and the third tap changer associated with a respective phase line; and
an electronic processor coupled to the first regulator control, the second regulator control, and the third regulator control, the electronic processor configured to,
determine an average voltage of the multi-phase power system based on a voltage of the first phase line, a voltage of the second phase line, and a voltage of the third phase line;
determine a voltage regulation command based on the average voltage and a multi-phase setpoint;
determine whether the first tap changer, the second tap changer, and the third tap changer are set to a same tap position;
issue the voltage regulation command to the first regulator control when the first tap changer, the second tap changer, and the third tap changer are at the same tap position.

9. The control system of claim 8, wherein the electronic processor is further configured to:
determine whether the voltage regulation command is a raise command or a lower command;
determine which of the first tap changer, the second tap changer, and the third tap changer is set to a lowest tap position; and
issue the voltage regulation command to the regulator control associated with the respective tap changer that is set to the lowest tap position when the voltage regulation command is a raise command.

10. The control system of claim 8, wherein the electronic processor is further configured to:
determine whether the voltage regulation command is a raise command or a lower command;
determine which of the first tap changer, the second tap changer, and the third tap changer is set to a highest tap position; and
issue the voltage regulation command to the regulator control associated with the respective tap changer that is set to the highest tap position when the voltage regulation command is a lower command.

11. The control system of claim 8, wherein the multi-phase setpoint includes a target bandcenter voltage for the multi-phase power system.

12. The control system of claim 11, wherein the electronic processor is further configured to:
determine whether the average voltage exceeds the target bandcenter voltage by a first amount; and
wherein the voltage regulation command is a lower command when the average voltage exceeds target bandcenter voltage by the first amount.

13. The control system of claim 11, wherein the electronic processor is further configured to:
determine whether the average voltage does not exceed the target bandcenter voltage by a first amount; and
wherein the voltage regulation command is a raise command when the average voltage does not exceed the target bandcenter voltage by the first amount.

14. The control system of claim 8, wherein the electronic processor is further configured to independently control each of the first, second, and third regulator controls when operation of at least one of the first, second, and third regulator controls is blocked.

15. A control system for a multi-phase power system including a first phase line, a second phase line, and a third phase line, the control system comprising:
a first regulator control configured to control a first tap changer;
a second regulator control configured to control a second tap changer;
a third regulator control configured to control a third tap changer, each of the first tap changer, the second tap changer, and the third tap changer associated with a respective phase line; and
an electronic processor coupled to the first regulator control, the second regulator control, and the third regulator control, the electronic processor configured to,
determine whether each of a voltage of the first phase line, a voltage of the second phase line, and a voltage of the third phase line are within band of a target bandcenter;
perform a voltage regulation operation when one or more of the voltages of the first phase line, the second phase line, and the third phase line are out of band of the target bandcenter; and
adjust a tap position of the tap changer associated with the phase line having a voltage furthest from the bandcenter.

16. The control system of claim 15, wherein the electronic processor is further configured to:
determine whether any of the voltages of the first phase line, the second phase line, and the third phase line differ from the target bandcenter by more than a threshold; and
adjust the tap position of the tap changer associated with the phase line having a voltage furthest from the bandcenter when of the voltages of the first phase line, the second phase line, and the third phase line differ from the target bandcenter by more than the threshold.

17. The control system of claim 15, further comprising a front panel including:
   a first sub-panel associated with first regulator control;
   a second sub-panel associated with the second regulator control; and
   a third sub-pan associated with the third regulator control.

18. The control system of claim 15, wherein the voltage regulation operation includes controlling the first, second, and third tap changers in a ganged manner.

19. The control system of claim 15, wherein the voltage regulation operation includes controlling the first, second, and third tap changers in an independent manner.

20. The control system of claim 15, wherein a value of a threshold can be defined by a user.

* * * * *